US011646897B2

(12) United States Patent
Kravitz et al.

(10) Patent No.: US 11,646,897 B2
(45) Date of Patent: May 9, 2023

(54) METHOD AND APPARATUS FOR UTILIZING OFF-PLATFORM-RESOLVED DATA AS AN INPUT TO CODE EXECUTION ON A DECENTRALIZED PLATFORM

(71) Applicant: Springcoin, Inc., Marina Del Rey, CA (US)

(72) Inventors: David William Kravitz, San Jose, CA (US); Fabrice Cheng, Los Angeles, CA (US); Matthew Benjamin Smith, Playa Vista, CA (US); Mollie Zechlin Halverson, Los Angeles, CA (US)

(73) Assignee: Springcoin, Inc., Marina del Rey, CA (US)

( * ) Notice: Subject to any disclaimer, the term of this patent is extended or adjusted under 35 U.S.C. 154(b) by 0 days.

(21) Appl. No.: 17/675,977

(22) Filed: Feb. 18, 2022

(65) Prior Publication Data

US 2022/0385477 A1    Dec. 1, 2022

Related U.S. Application Data

(60) Provisional application No. 63/195,262, filed on Jun. 1, 2021.

(51) Int. Cl.
*G06F 21/62*     (2013.01)
*H04L 9/32*      (2006.01)
(Continued)

(52) U.S. Cl.
CPC .............. *H04L 9/3247* (2013.01); *H04L 9/50* (2022.05)

(58) Field of Classification Search
None
See application file for complete search history.

(56) References Cited

U.S. PATENT DOCUMENTS 10,880,077 B2   12/2020  Wei
10,924,264 B2    2/2021  Wilson
(Continued)

FOREIGN PATENT DOCUMENTS

CN    111402050 A  *  7/2020
CN    111612453 A  *  9/2020  ........... H04L 9/3247
(Continued)

OTHER PUBLICATIONS

Design Pattern as a Service for Blockchain Applications. Lu. IEEE. (Year: 2018).*

(Continued)

*Primary Examiner* — Venkat Perungavoor
(74) *Attorney, Agent, or Firm* — Fitch, Even, Tabin & Flannery LLP

(57) ABSTRACT

A coordinating network element manages a protocol that makes attestations of off-platform-resolved data and decisions available for use on a blockchain platform or on another decentralized-execution-based platform operational within a multi-tenant environment. By one approach, these teachings provide for off-platform-verified data pertaining to individual-, group- or machine-based users to be blinded from access by the coordinating network element and by the platform while utilizing a tokenized form of such data to enable user-initiated queries that involve solely on-platform vetting of users as a condition of fulfilling user requests for service.

36 Claims, 18 Drawing Sheets

(51) Int. Cl.
  *G06F 21/71*  (2013.01)
  *G06F 21/64*  (2013.01)
  *H04L 9/00*  (2022.01)

(56) References Cited

U.S. PATENT DOCUMENTS

2017/0317833 A1   11/2017  Smith
2018/0204191 A1    7/2018  Wilson
2018/0351747 A1*  12/2018  Spangemacher ....... G06F 21/31

FOREIGN PATENT DOCUMENTS

KR        20190128532 A      11/2019
WO    WO-2019021311 A1 *   1/2019  ............ G06Q 40/02
WO    WO-2020076178 A1 *   4/2020  ............ G06F 16/27

OTHER PUBLICATIONS

Blockchain Technology for Applications Internet of Things—Mapping From System Design Perspective. Viriyasitavat. IEEE. (Year: 2019).*

International Search Report and Written Opinion from Application No. PCT/US2022/030016; dated Aug. 31, 2022; 9 pages.

Thomas Hardjono et al.,'Towards an attestation architecture for blockchain networks', Springer, Mar. 11, 202; 29 Pages.

Alex Norta et al., 'A Decentralized Blockchain System for the Attestation and Authorization of Digital Assets Version 0.8c', DOI: 10.13140/RG.2.2.25027.96807/1, Oct. 15, 2019; 40 pages.

Cheng Xu et al., A Remote Attestation Security Model Based on Privacy-Preserving Blockchain for V2X', IEEEAccess, vol. 6, DOI: 10.1109/ACCESS.2018.2878995, Nov. 9, 2018; 10 pages.

Credentials Community Group (W3C); A Primer for Decentralized Identifiers; Nov. 11, 2021; 6 Pages.

Thomas Page, "The application of hash chains and hash structures to cryptography," Technical Report RHUL-MA-2009-18; Aug. 4, 2009; 234 pages.

"Open Mobile Alliance (OMA) DRM Specification," Approved Version 2.0.2; Jul. 23, 2008; 152 pages.

Raymond Cheng, Fan Zhang, Jemej Kos, Warren He, Nicholas Hynes, Noah Johnson, Ari Juels, Andrew Miller, and Dawn Song, "Ekiden: A platform for confidentiality-preserving, trustworthy, and performant smart contracts," in 4th IEEE European Symposium on Security and Privacy (EuroS&P); Jun. 17-19, 2019; 16 pages.

"Ethereum Whitepaper"; Vitalik Buterin; 2014; 36 pages.

Kobi Gurkan, Koh Wei Jie, Barry Whitehat: "Community proposal: Semaphore: Zero-Knowledge Signaling on Ethereum," White Paper; Mar. 31, 2020; 18 pages.

Sam M. Werner, Daniel Perez, Lewis Gudgeon, Ariah Klages-Mundt, Dominik Harz, William J. Knottenbelt, SoK: Decentralized Finance (DeFi); Version 1, Jan. 21, 2021; 19 pages.

* cited by examiner

FIG. 4
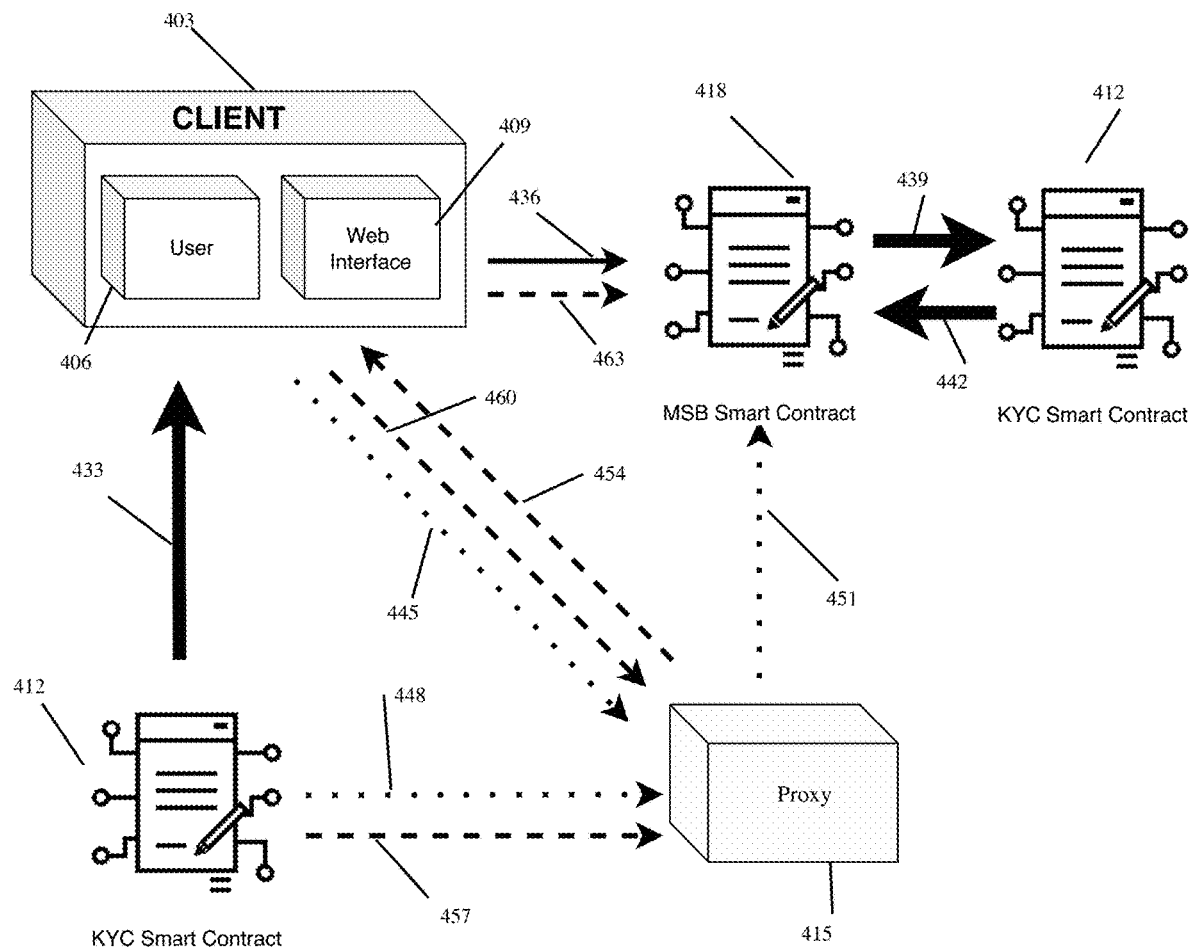
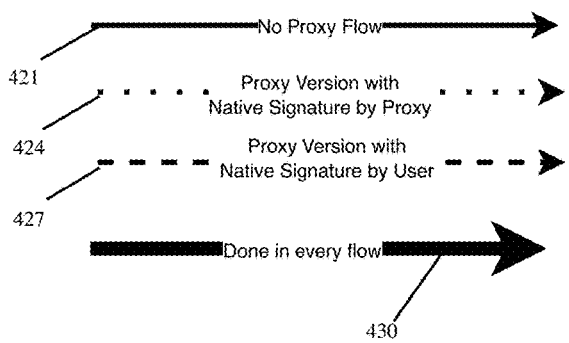

US 11,646,897 B2

METHOD AND APPARATUS FOR UTILIZING OFF-PLATFORM-RESOLVED DATA AS AN INPUT TO CODE EXECUTION ON A DECENTRALIZED PLATFORM

RELATED APPLICATIONS

This application claims the benefit of U.S. patent application Ser. No. 17/470,097, filed Sep. 9, 2021, U.S. patent application Ser. No. 16/817,483, filed Mar. 12, 2020, and U.S. Provisional application No. 63/195,262, filed Jun. 1, 2021, which are each incorporated by reference in their entirety herein.

TECHNICAL FIELD

These teachings relate generally to accessing data and more particularly to the preservation of privacy.

BACKGROUND

Know Your Customer (KYC) regulation and Anti-Money Laundering (AML) directives constitute important elements of business conducted by a Money Services Business (MSB). Decentralized Finance (DeFi), as conducted on a blockchain via an MSB smart contract, has typically lacked a viable, efficient, and secure methodology that makes aspects of KYC and AML that have been resolved for entities or individual Users off-chain readily available for on-chain utilization. It is to be understood hereinafter that a User may refer to an individual User, a group of Users (e.g., a corporate entity) or a machine (e.g., an Internet of Things device) as individual-, group- or machine-based Users, respectively.

The problem can be succinctly stated as: bringing off-platform (e.g., off-chain) identity data securely and safely to the blockchain platform or to another decentralized-execution-based platform. Where the term blockchain is used herein, it is intended to refer more generally to a decentralized-execution-based platform (also known as a decentralized platform).

Decentralized applications are currently powered by fully transparent programmatic code, or "smart contracts." In typical blockchain network contexts, all smart contract transactions are executed by all nodes, modifying the state, resulting in a common, shared final state after each new block. Although the term "smart contract" is used extensively herein, it may be considered more generally to denote executable code and associated (stateless and/or stateful) storage as incorporated into a decentralized platform.

This specific characteristic is the primary reason why smart contracts cannot retrieve off-chain/off-platform data (e.g., via connecting to an API) as the results can vary over time, and differences in data retrieval between nodes would result in divergent final states of the blockchain.

To solve this problem, decentralized applications have been relying on "oracles." Oracles are smart contracts that rely on off-chain/off-platform services responsible to retrieve off-chain/off-platform data at a point in time and attest the data back to the originator of the request.

While this oracle approach currently solves and enables bringing off-chain/off-platform data to smart contracts, it has some drawbacks: (1) transactions are asynchronous, i.e., the request for off-chain/off-platform data and actually attesting the data back to the smart contract happens in two distinct transactions, wherein this limitation prevents smart contracts from accessing off-chain/off-platform data in a synchronous and atomic manner; (2) since oracles rely on an off-chain/off-platform service in order to retrieve data, this introduces a central point of failure in that smart contracts using oracles can become inoperative if the oracle infrastructure is down, or the oracle service provider shuts down; (3) consumers have no control over which smart contracts can have access to their data.

A more desirable solution to this problem would have the following characteristics: (1) direct access to off-chain/off-platform data through smart contracts, thus removing the single point of failure and up-time risks; (2) accessing off-chain/off-platform data in a synchronous and atomic manner; (3) consumers have control over who can have access to their off-chain/off-platform data brought on-chain/on-platform; (4) suitable for deployment on a public or private platform that utilizes distributed ledger technology (DLT).

BRIEF DESCRIPTION OF THE DRAWINGS

FIG. 4 comprises a flow diagram as configured in accordance with various embodiments of these teachings and that illustrates multiple methods of performing a Query for the purpose of data corroboration, including communication with a Client, Proxy (in some of the methods), KYC Smart Contract and MSB Smart Contract. The transmissions depicted in FIG. 4 may include an overlay, such as encryption that is subsequently decrypted, that is not explicitly shown;

DETAILED DESCRIPTION

Figure 1:
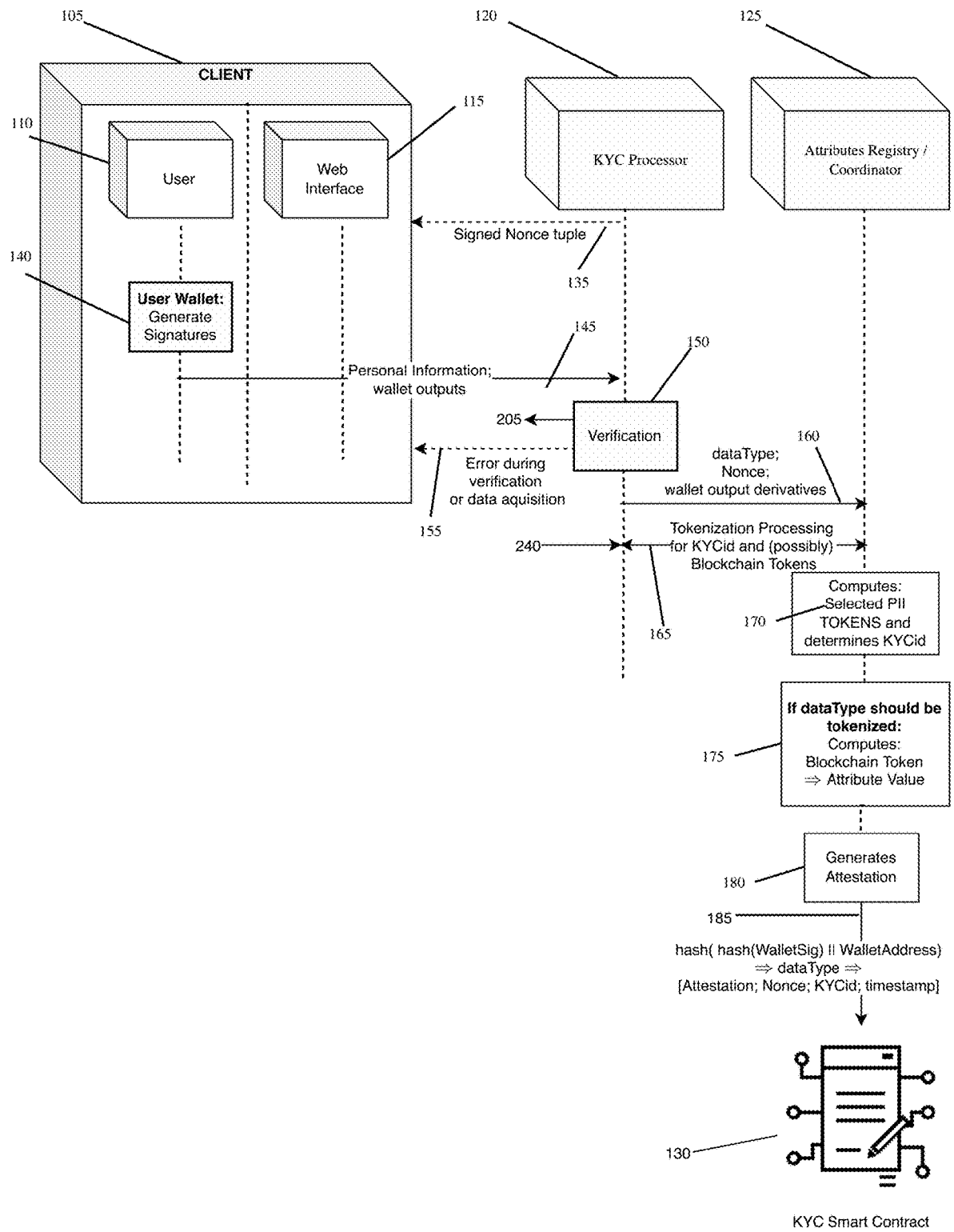
FIG. 1 comprises a flow diagram as configured in accordance with various embodiments of these teachings and that illustrates attesting to enable corroboration and transference, including communication with a Client, KYC Processor, Coordinator (as an element of an Attributes Registry) and KYC Smart Contract as part of Attestation activity. Note that attesting to enable corroboration and transference does not imply that corroboration and/or transference ultimately occurs. The transmissions depicted in FIG. 1 may include an overlay, such as encryption that is subsequently decrypted, that is not explicitly shown. It is to be understood hereinafter that a Client may operate on behalf of a User. In the case of a machine as User, the User may be hosted on a Client or the User and Client may be one and the same.

Although it is possible to implement a system based on User-requested on-demand MSB-specific yay or nay on-chain/on-platform issuer-/KYC Processor-signed Attestations (where such Attestations could incorporate information representing, e.g., User identity, MSB identity/MSB policy number, timestamp, hash(off-chain-/off-platform-stored data), and/or the current blockchain height/blockchain hash, and the issuer/KYC Processor signature verification public key(s) are whitelisted on-chain/on-platform), by one approach the current teachings focus primarily on embodiments of a process that does not rely on awareness by the infrastructure of MSB requirements, i.e., the infrastructure remains oblivious of application-level considerations. These teachings enable continuously updatable on-chain/on-platform Coordinator Attestations via personalized tokenization of Users' current raw attribute values (e.g., credit score intervals). By one approach, this is achieved via deployment of a choice of direct Attestations as well as information-hiding Attestations, where query of information-hiding Attestations involves use of proxies/intermediaries, or selective release by the User to control the granularity of information disclosed about that User's currently assigned values of an attribute (e.g., by proving containment within lower and/or upper bounds via a (closed-, open-, or inverted-open-) "sandwich" paradigm). The intended effect of the sandwich paradigm can be characterized as follows: access to the User-personalized assignment of the interval of values of the attribute represented by the Attestation is hidden; however, the User can query against the Attestation to selectively release access to a restricted range of values that includes the interval of values of the attribute.

The terms "wallet" as used herein is to be understood as being replaceable by a more general term, i.e., "key-pair-enabled app," where such a key-pair-enabled app can be implemented as software or hardware or a combination thereof. Further, such key-pair-enabled app can run locally to a User or remotely or as a hybrid/combination thereof, e.g., as a Client-side software component, Client-embedded hardware, as a peripheral device supported by a Client, or as a cloud-based application. The term "wallet" can thus be replaced by the term "key-pair-enabled app" whether appearing stand-alone or as a modifier or as modified, e.g., WalletAddress, WalletPubKey, User Wallet or User-registered wallet. The term "Client" as used herein is to be understood to be implementable as software, hardware or a combination thereof. A "key pair" (when considered, for example, in the context of a "key-pair-enabled app") refers to a pair of cryptographic keys, such as a private key used to generate digital signatures and a corresponding public key used to verify such digital signatures.

A list of properties preferably fulfilled by a desirable blockchain platform-compatible (or another decentralized-execution-based platform-compatible) KYC solution follows: (1) avoids dependency on off-chain/off-platform data retrieval via oracles in order to execute Query against KYC Attestations involving User-registered wallets (also denoted as User Wallets herein); (2) compatible with existing public blockchain platforms; (3) compatible with existing software/hardware blockchain wallets; (3)(a) no reliance on non-standard export of parameters; (3)(b) no reliance on non-standard local storage/retention or retrieval; (4) consistent (preferably non-User-circumventable) pseudonymous identification of Users spanning across wallets, KYC Processors and acceptable forms of User identification; (4)(a) cross-wallet association to a User can be (selectively and reversibly) deactivated for future registered wallets of that User, e.g., under authorization of all KYC Processors through which a User has registered; (5) thwarts verifiability of wallet address association to an enrolled User (even if guessing against candidate wallet addresses collected from arbitrary blockchain transactions) until that User's initiation of a Query involving their registered wallet; (6) registering of an earlier-registered wallet by a User automatically rendering Query activity against previous posts as unusable to ascertain/validate the User's current Attribute Value(s) (i.e., the attested-to versions of the value of an attribute as pertaining to a specific dataType) of any dataTypes addressed via reposting; (7) Attribute Values updatable by the KYC Attestation network without User involvement; (7)(a) network-initiated updates are distinguishable from User reposts, for auditable differentiation; (8) attempted replay of a captured Query that uses a wallet to freshly sign the transaction that differs from the underlying registered wallet is detectable and will be rejected through execution of a conformant application/MSB Smart Contract that invokes the KYC Smart Contract; (8)(a) this property prevents misappropriation by a User of another User's KYC profile that may be preferable to their own; (9) minimizes number of wallet signature verifications needed in order to process Queries that take advantage of the capability for live KYC-checking of User's Attribute Values as a condition of granting service; (10) efficiently uses communications bandwidth to minimize transaction costs of Queries; (11) offers optional privacy-enhancement capability to validate that one or more User's Attribute Values satisfy application-specific range or subset requirements set as an application-specific policy (e.g., pertaining to credit scores or zip codes) without exposing the granular data to the public immutable blockchain; (11)(a) preferably, the KYC Attestation network can operate without awareness of application/MSB-specific criteria/policies, which can change dynamically, without sacrificing validation proofs relative to existing KYC Attestations; (11)(b) preferably, Users can opt in or out of such granular-data suppression system without affecting their capability to meet application-specific KYC requirements for service fulfillment; (11)(c) preferably active attempts by a User to glean granular information about other Users are aborted. Hereinafter a wallet may be construed as a single wallet capable of digitally signing or may alternatively be implemented as a composition wallet comprised of multiple component wallets such that requisite signatures are generated by subsets of such composition wallet where each component wallet within a subset generates signatures or partial signatures that are combined to formulate signatures. Known methods to instantiate such composition wallet include multisignatures and threshold signatures.

A KYC Processor herein is a requesting network element that is acting within an attestor role. The coordinating network element (i.e., Coordinator) finalizes the generation of the Attestation and stores it and associated metadata in a database characterized as a component of a blockchain or another decentralized platform (e.g., via transacting with a KYC Smart Contract), which the Coordinator delegates as acting on its behalf relative to incoming Query requests by virtue of using the storage of such smart contract as its repository for Attestations and associated metadata. The KYC Smart Contract is coded to modify its state to store Attestations and associated metadata only if an incoming transaction is signed such that verification of the signature is successful using a public key that is recognized by the smart contract for this purpose. An entity acting within a requestor role need not be directly authenticated as authorized to successfully submit a Query to the KYC Smart Contract and need not be an element of the network that includes network elements acting within an attestor role, the coordinating network element and Servers or processors that participate in tokenization (e.g., Backend, Translator). An example of an entity acting within a requestor role that submits Queries to the KYC Smart Contract is an MSB Smart Contract (where MSB denotes a money services business). The indirect authentication as authorized to successfully submit a Query occurs as a result of the MSB Smart Contract receiving a transaction which includes a signature generated by the User (i.e., the Client utilized by the User) associated with the Attestation to be queried where the public key used by the MSB Smart Contract to verify that signature or a function thereof (e.g., a wallet address) is passed to the KYC Smart Contract as part of the invocation of the KYC Smart Contract as a necessary element of locating the Attestation within the storage used by that smart contract. Further, in order to result in a positive match of computation by the KYC Smart Contract code of the Attestation against the Attestation that was previously provided by the coordinating network element, the MSB Smart Contract provides the KYC Smart Contract with information derived from that provided by the User during the Query as regenerated by the User for this purpose, such as by making use of a wallet private key available to the User's Client. The User's input to the Query process may be provided in the form of a transaction that is signed by the User or one that is signed by a Proxy with which the User communicates directly. There may be a plurality of coordinating network elements/Coordinators and/or of Attributes Registry sub systems.

Tokenization (as exemplified below as KYC Identifiers, Blockchain Tokens, User-specific Tokens, and Pre-Attestations, respectively):

KYC Identifiers: The intent is to enable cross-correlation of wallets pertaining to the same User. This is achieved by tokenizing data (such as personally identifiable information) that represents the User. Such data can be tokenized individually (such as tokenizing name and separately tokenizing date of birth) or in combination. A cryptographic function (such as a cryptographically-keyed function) may be superimposed (e.g., by the coordinating element) in order to distinguish the finalized tokens from tokens generated for other use cases. Rather than utilizing this finalized token as a KYC Identifier posted to the blockchain, the coordinating network element may assign a preferably unique independently generated value to each finalized token and use such assigned value as a KYC Identifier that appears on the blockchain. Such an assigned value may be deleted from the Coordinator database and replaced by another if such refresh is warranted.

Blockchain Tokens: Blockchain Tokens each represent a range of values of an attribute such as an interval or a plurality of intervals (hereinafter denoted as a raw attribute interval). Tokenization can be completed by the same processors that handle tokenization for other use cases, where a private function may be superimposed as a final step by the coordinating network element, preferably different than that, if any, used to generate tokens stored at the Coordinator as KYC Identifiers or as tokens paired with independently generated values that are posted to the blockchain as KYC Identifiers. The intervals that are tokenized as Blockchain Tokens are preferably chosen independently of MSBs, although each MSB may independently generate its policy on which such ranges are considered acceptable as prerequisites to grant services, i.e., to a User whose actual value for the given data type falls within such an acceptable interval. The enforcement of such a policy may be delegated to a Proxy that a User communicates with directly at the time of initiating a Query. Each Proxy may be given access to those Blockchain Tokens that it needs to perform its assigned roles. The KYC Processor, as a requesting network element that acts within an attestor role and that requests tokenization of intervals resulting in Blockchain Tokens, need not actually access such Blockchain Tokens since they are used by the Coordinator during the process of generating Attestations and are used by Proxies during Queries. It can be considered that there is a specific need for a party other than the Coordinator and the requesting network element that acts within an attestor role or requestor role to have ready access to Blockchain Tokens. A Proxy, as such a party, need not directly request tokenization. Rather, Blockchain Tokens finalized by the Coordinator may be made available to a Proxy during setup of that Proxy. The Coordinator can remain blinded to the underlying data that was tokenized. Since, in practice, it is desirable that a Proxy has access to pairs where each pair is comprised of an interval and its corresponding Blockchain Token (where intervals may be indexed by data type), requests for tokenization of intervals by a KYC Processor for the purpose of eventually provisioning one or more Proxies may be completed in large bulk operations and may be scrambled so that the Coordinator is blinded from the specific scrambling that was used, while a Proxy that is set up with Blockchain Tokens is made aware of which intervals each such Blockchain Token corresponds to.

Figure 15:
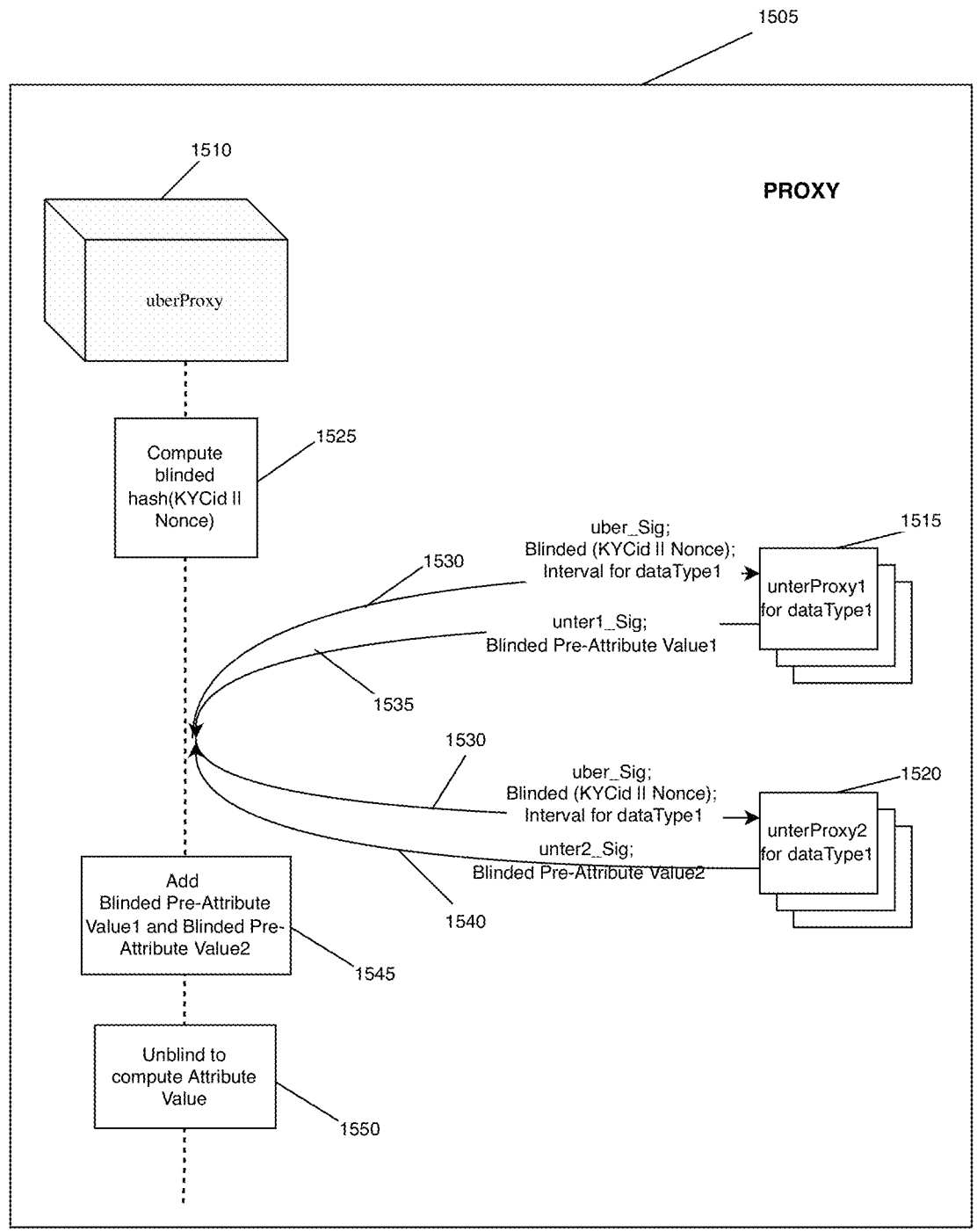
FIG. 15 comprises a flow diagram as configured in accordance with various embodiments of these teachings and that illustrates a further embodiment of the Proxy processing to form the Attribute Values from Blockchain Tokens, including communication between the unterProxies and uberProxy. The transmissions depicted in FIG. 15 may include an overlay, such as encryption that is subsequently decrypted, that is not explicitly shown.

User-specific Tokens (as computed Attribute Values): User-specific Tokens are generated upon request by a User. Preferably, a suitable method is used to ensure that a User cannot successfully request such tokenization if it results in generation of User-specific Tokens that do not correspond to the requesting User. User-specific Tokens may typically be configured so as not to utilize secure multiparty computation with regard to application of static (as opposed to ephemeral) preferably securely held tokenization parameters. Applying multiple preferably independently and securely held static secrets during tokenization (e.g., as prescribed in U.S. application Ser. No. 16/817,483) is useful to persistently prevent exposure via the tokens themselves of the information that is tokenized. However, to the extent that the information that is tokenized is publicly exposed in the same or nearly the same order as the requests for tokenization across Users (e.g., if User-generated transactions that incorporate User-specific Tokens are submitted by the respective User during Query for incorporation within a future block of the blockchain), the information that is tokenized may be retrievable from the combination of such transaction and the Attestation(s) and associated metadata (already on the blockchain) to which the transaction refers (although the correlation between off-chain/off-platform tokenization requests and evidence of resultant tokens on the blockchain may potentially be offset via such measures as randomized off-chain/off-platform load-balancing across multiple entities tasked with tokenization and introduction of spurious tokenization requests that do not correspond to actual User-initiated Queries). This observation remains true even if the User-specific Tokens themselves are opaque in the absence of collusion because secure multiparty computation is applied during tokenization. There is, nevertheless, demonstrable utility in at least transiently blinding, by applying a transient blinding factor, the information to be tokenized (preferably using a different (e.g., randomized) blinding factor for each request) in that this information is User-specific and if exposed prematurely, i.e., prior to committing to tokenization results, it may be used to target specific Users as victims of misapplied tokenization, e.g., in order to purposefully cause a false negative during corroboration processing via the KYC Smart Contract code. Requests for tokenization herein are preferably authenticated. The choice of tokenization secret to apply herein during compliant processing is variable and dependent on instructions included within the tokenization request. More specifically, the tokenization secret that is applied may be a function of a Blockchain Token, where the choice of Blockchain Token is dependent on the instructions. In some embodiments of the invention, a Proxy contacted by a User is split into component hierarchical sub-Proxies wherein at least one sub-Proxy is at least transiently blinded by another sub-Proxy from access to User-specific information, e.g., a first sub-Proxy at least transiently blinds, by applying a transient blinding factor, the User-specific information before making it available to a second sub-Proxy for use in computation by the second sub-Proxy and removes the transient blinding factor from the result of computation by the second sub-Proxy. In such case, a sub-Proxy that is authorized by an MSB to correspond directly with Users and carry out its policy may authenticate itself to a sub-Proxy that is authorized to access Blockchain Tokens, although in alternative embodiments a first sub-Proxy may not necessarily authenticate itself to a second sub-Proxy and/or that sub-Proxy may not have sufficient information to verify such authentication. The Proxy subsystem can be configured so that there is no need for distinct sub-Proxies that are each authorized by one or more MSBs (where two or more sub-Proxies may potentially be authorized by the same MSB) to share any secret parameters. For availability and load-balancing, a plurality of sub-Proxies may be authorized to have common access to one or more sets of Blockchain Tokens. Tokenization requests may be authenticated by a sub-Proxy as coming from an authorized sub-Proxy without the need for additional key management. For example, a sub-Proxy that receives such tokenization requests may take advantage of the fact that each MSB Smart Contract is coded to whitelist the signature verification keys that correspond to sub-Proxies the relevant MSB has authorized to enforce its policy. Therefore such publicly accessible signature verification keys may be used also by sub-Proxies that receive tokenization requests. Sub-proxies responsible for generation of User-specific Tokens (and therefore entrusted to directly access Blockchain Tokens) may operate independently of control by any MSB. In alternative embodiments, the partitioning into sub-Proxies may be collapsed into a monolithic Proxy operation. User-specific Tokens may be constructed the same regardless of whether or not the Proxy that generates it is partitioned as split into component hierarchical sub-Proxies that are differentially authorized. If it is considered worth the additional off-chain/off-platform communications in order to split access to Blockchain Tokens and therefore render tokenized intervals of attributes in the form of User-specific Tokens persistently opaque in the absence of collusion, then parallelized secure multiparty computation may be utilized (e.g., as depicted in FIG. 15 herein). This would shield against unauthorized access to intervals that are tokenized even where User-specific Tokens are publicly accessible, e.g., read from transactions at the time of submission for incorporation in a blockchain or when subsequently incorporated into blocks as a result of mining. The transient blinding factor, if randomly or pseudo-randomly generated, blinds upfront awareness of repeats of User-specific information from a recipient sub-Proxy whether or not the actual User-specific information is ultimately visible to that sub-Proxy. That sub-proxy may not be able to reproduce the totality of the User-specific information if the User-specific information includes a hidden parameter. As an example of such, the User-specific information may, in a particular embodiment, be characterized so as to include a generally hidden parameter such as a function of a signature generated by the User's wallet, where such function of a signature is privately provided by the User's software to a first sub-Proxy with which it communicates (as well as made available to the KYC Processor for use by the Coordinator), but the first sub-Proxy preferably withholds that function of a signature from a second sub-Proxy that has access to Blockchain Tokens (as well as from other Users). The same function of a signature is derivable by the Coordinator using, at least in part, some function of a signature received by the Coordinator based on information provided to the KYC Processor by the User's software.

Pre-Attestations: Pre-Attestations, e.g., as Pre-Attestation_Up and/or Pre-Attestation_Down, comprise a tokenized version of the raw attribute interval assigned to a User relative to a specific dataType, in that the User's current specific value of the attribute is embedded within such raw attribute interval, and such attribute interval is encapsulated within the Pre-Attestation as representative of just that single raw attribute interval or as representative of a plurality of raw attribute intervals. Preferably, a Pre-Attestation generated by a Client associated with a User during Query provides information in that the raw attribute intervals that the Pre-Attestation is representative of do not comprise the totality of possible raw attribute intervals relative to the specific dataType. In that sense, Pre-Attestations constitute a form of selective release of information by a User as a restriction beyond all possible raw attribute intervals. Selective release here refers to the property that the User does not necessarily isolate down to the specific raw attribute interval in which the User's current specific value of the attribute is contained and the User has a choice of the granularity of information to release, e.g., in how many raw attribute intervals to include as represented by the Pre-Attestation as "buffer intervals" that do not contain the User's current specific value of the attribute, and thus cushion against full disclosure. Note that even disclosing knowledge of the raw attribute in which the User's current specific value is contained may still shield to an extent against disclosure of the User's current specific value. A given instance of a Query may involve two or more Pre-Attestations, e.g., as a Pre-Attestation_Up and a Pre-Attestation_Down, that can be considered jointly in order to reap the full extent of release of information intended by the User. Selective disclosure within this context can be considered as unblinding, at least to an extent, the information-hiding version of the User's assigned raw attribute interval that was attested to, e.g., as incorporated within the Attestation as Attestation_Up and/or Attestation_Down.

Transference of attested-to data content: In the current invention, transference may occur through exhaustion of potential Attribute Values against previously posted Attestations, e.g., through execution during Query of KYC Smart Contract code in a limited capacity by the choices coded into the smart contract as available at a time of a Query against an Attestation. Transference herein may be requested by an arbitrary entity (e.g., an MSB Smart Contract), and transferred Attribute Values may be publicly visible. In an alternative embodiment, transference may be of i and/or j values, as relevant to FIG. 17 herein.

Corroboration of data content against previously attested-to data content: Query requests, e.g., from an MSB Smart Contract to the KYC Smart Contract, may explicitly include (as cleartext) the data as Attribute Values to be checked for matches against previously posted Attestations. Additionally or alternatively, Attribute Values within Query requests may be in tokenized form, e.g., as User-specific Tokens. Alternatively, Query requests may include Pre-Attestations, as relevant to FIG. 17 herein. Note that in the case of transference, if any, on the part of a KYC smart contract is preceded by corroboration of one or more potential Attribute Values and/or Pre-Attestations against one or more Attestations. Thus, a Query is for the purpose of data corroboration in such case as well.

Figure 5:
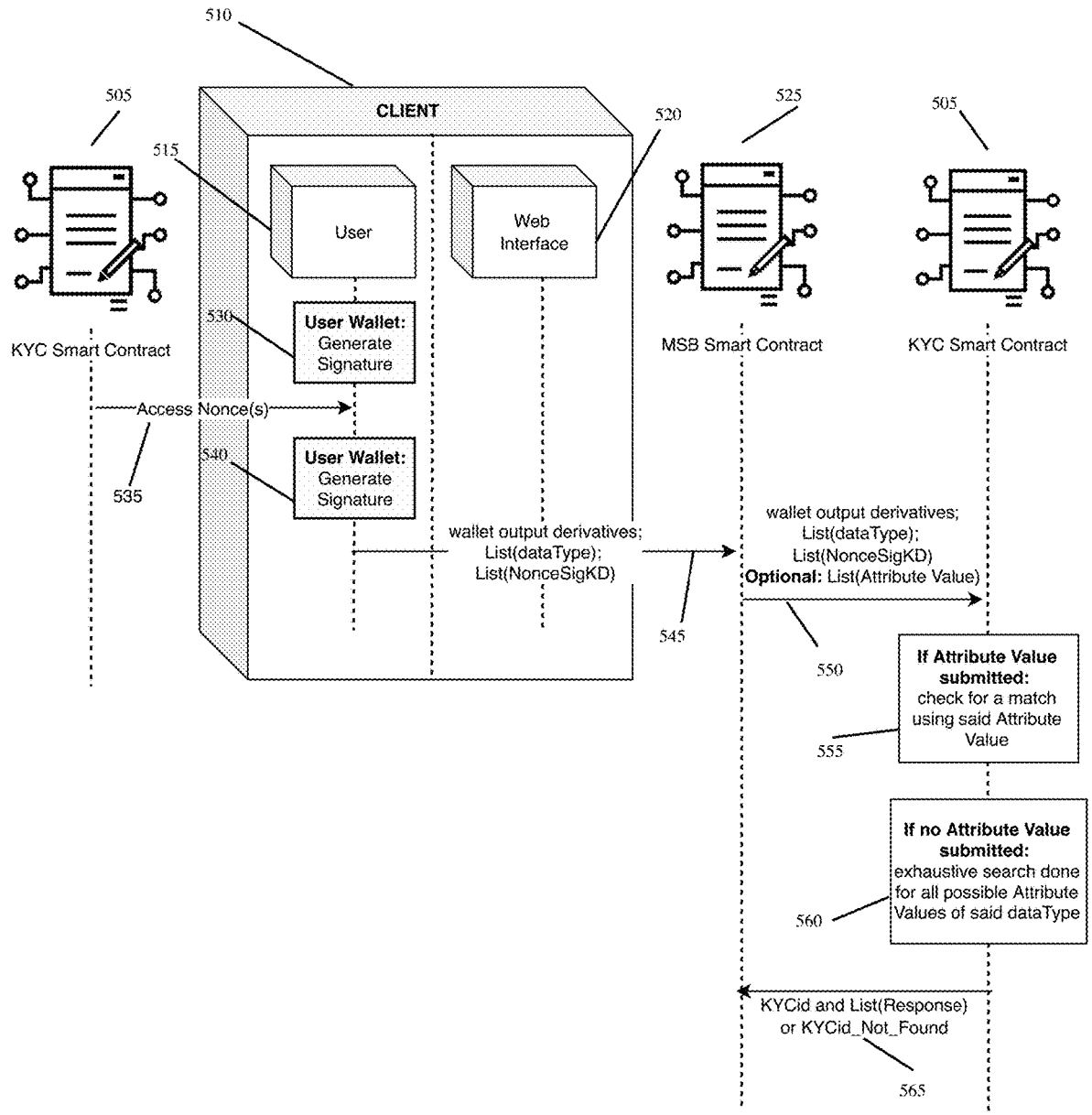
FIG. 5 comprises a flow diagram as configured in accordance with various embodiments of these teachings and that illustrates a method of performing a Query for the purpose of data corroboration, including communication with a Client, KYC Smart Contract and MSB Smart Contract. The transmissions depicted in FIG. 5 may include an overlay, such as encryption that is subsequently decrypted, that is not explicitly shown.
Figure 6:
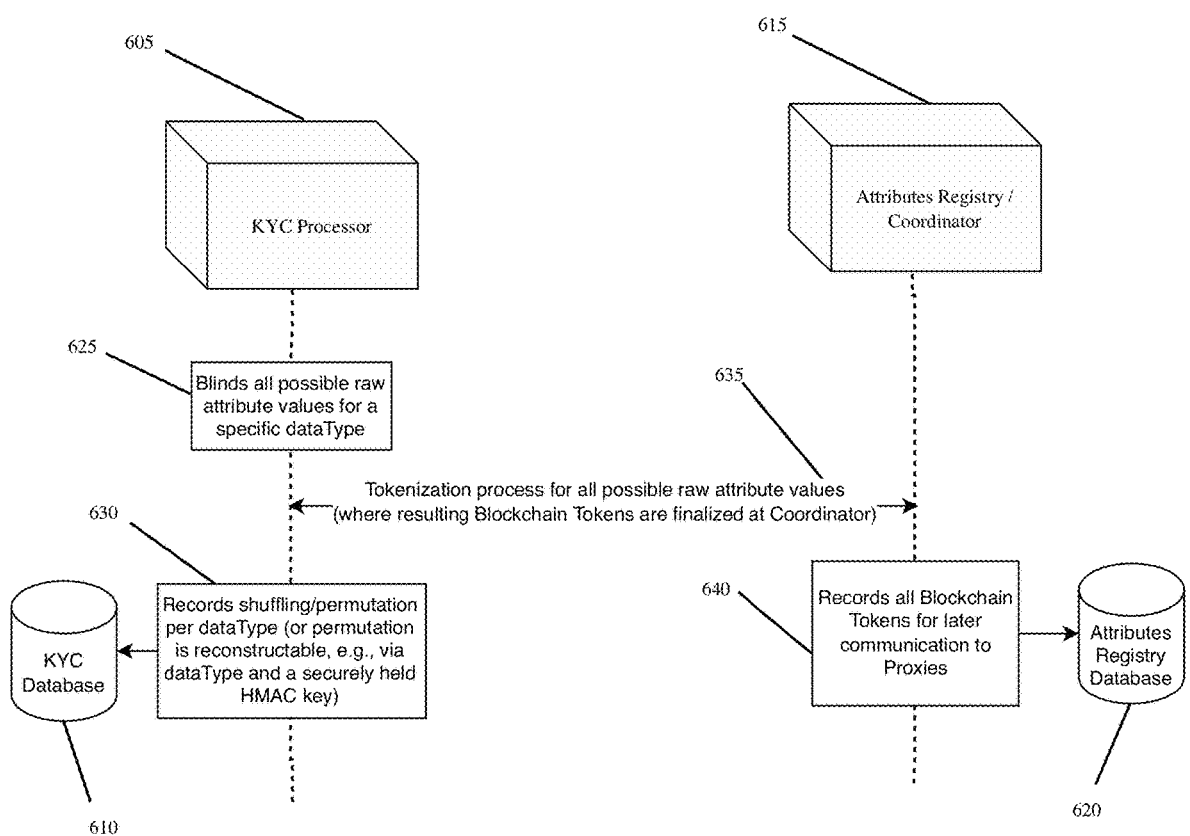
FIG. 6 comprises a flow diagram as configured in accordance with various embodiments of these teachings and that illustrates the bulk computation of Blockchain Tokens (also more generally denoted herein as Platform Tokens), including communication between the KYC Processor and the Attributes Registry/Coordinator. The transmissions depicted in FIG. 6 may include an overlay, such as encryption that is subsequently decrypted, that is not explicitly shown.

As adapted (at a high level omitting details for the purpose of clarity) from FIG. 4, FIG. 5 and FIG. 6 of U.S. application Ser. No. 17/470,097 as FIG. 12 and FIG. 13 of the current invention, tokenization that results in KYC Identifiers and/or Blockchain Tokens can be instantiated by network elements within a preferably-secure multiparty computation framework (also known as a KYC framework) that utilizes a Backend and Coprocessor acting sequentially or in parallel, respectively, in addition to the contribution to Tokenization by the Coordinator/Translator. Actual access to the content of Attestations via Requestors occurs independently of involvement of the Coordinator as coordinating network element. Query does not involve communication with the Coordinator for the purpose of authorization by the Coordinator of the Requestor; nor does Query utilize live tokenization that involves the coordinating network element or other network elements. Query via a Proxy may involve utilization of tokens that have been prestored for access by the Proxy (e.g., Blockchain Tokens) as well as live tokenization built upon such prestored tokens (e.g., resulting in User-specific Tokens).

Referring now to FIG. 1, a Client 105 is comprised of a User 110, and a Web Interface 115 that the User 110 utilizes to make network requests, submit information and retrieve information. The Client's Web interface 115 retrieves a Signed Nonce tuple=[Nonce; Nonce_validity_period; Sign(Nonce; Nonce_validity_period)] (as included in Table 1) at 135 from the KYC Processor 120, where the KYC Processor 120 randomly/pseudorandomly generates Nonce values and digitally signs or uses another keyed function on each such Nonce and its associated validity period/expiration/timestamp. For example, a keyed function could be an HMAC in which the HMAC key is held by the KYC Processor 120 and preferably stored securely. The KYC Processor 120 has made such a Signed Nonce tuple available via the Client's Web interface 115.

The User 110 utilizes their wallet via a Client 105 to generate the necessary deterministic digital signatures using their wallet private key at 140: WalletSig=Sign(WalletAddress); NonceSig=Sign(Nonce), both of which are as included in Table 1 (as well as is WalletAddress). These signatures are herein referred to as wallet outputs. The User 110 provides the following to the KYC Processor 120 via a Client 105 at 145: personal information/identification; WalletPubKey=User's wallet public key as included in Table 1; Signed Nonce tuple; wallet outputs.

Figure 2:
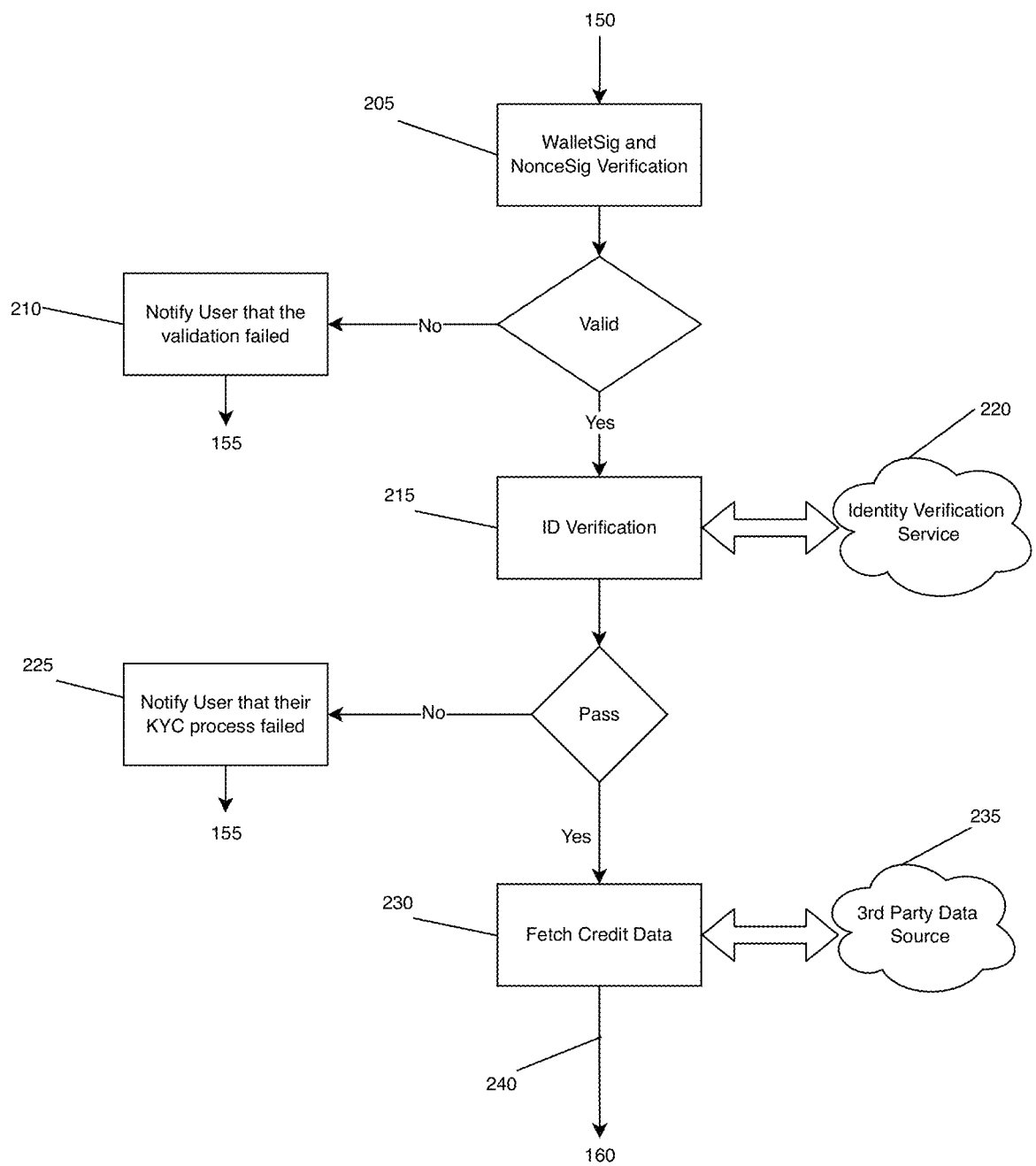
FIG. 2 comprises a flow diagram as configured in accordance with various embodiments of these teachings and that illustrates the sourcing and verification of data that takes place before an Attestation is made. The transmissions depicted in FIG. 2 may include an overlay, such as encryption that is subsequently decrypted, that is not explicitly shown.

The KYC Processor 120 verifies validity of the Signed Nonce tuple, wallet outputs, personal information, and information (such as the User's credit score) supplied by other sources during the Verification and Data Acquisition shown at 150 and shown in more detail in FIG. 2. The KYC Processor 120 may run into errors during verification in FIG. 2 at 215 or 235, in which case instead of returning at 240 of FIGS. 2 to 160 of FIG. 1, the KYC Processor would return an error to the Client 105 at 155 of FIG. 1. If no error occurs, the KYC Processor 120 computes hash(WalletSig) and hash(NonceSig) referred to in FIG. 1 as wallet output derivatives transmitted at 160.

The KYC Processor 120 transmits to the Attributes Registry/Coordinator 125: dataType; Nonce; wallet output derivatives at 160 (as well as WalletAddress or WalletPubKey which can be used to determine WalletAddress). At 165, the KYC Processor 120 requests tokenization of selected data that corresponds to the User 110 (which may be personally identifiable information (PII) data). Such data may be extracted directly from the User's presented form of identification and/or be derived from the vetting process during the Verification and Data Acquisition step at 150. Preferably, such data is consistent across all legitimate/acceptable forms of identification independently of which KYC Processor 120 is involved. Selected aspects of data/PII can be (a) tokenized jointly, or (b) tokenization can be addressed on an individual aspect basis, or (c) tokenization of some selected aspects may be joint/combined while others may be tokenized individually. The Attributes Registry/Coordinator 125 determines the KYCid at 170, potentially using Selected PII TOKENS (as in (b) above and included in Table 1) as in one embodiment in which the (composite token) pre-KYCid=HMAC(KYC_HMAC_KEY, hash(Selected PII TOKENS)), where KYC_HMAC_KEY is an HMAC key held by the Coordinator 125, preferably used solely for the purpose of generation of pre-KYCid values. In one embodiment KYCid is a randomly generated value that is associated with the pre-KYCid within a database accessible to the Attributes Registry/Coordinator 125, where the terms KYCid and pre-KYCid are as included in Table 1. The Attributes Registry/Coordinator 125 should therefore attempt to look up the pre-KYCid in the database. If no entry is found, then a new random value is generated, entered in the database as associated with the pre-KYCid and used as the KYCid. Preferably, pre-KYCid is unique per User 110. Fuzzy hashing of User facial features may potentially be used as an aid in acquiring such uniqueness of pre-KYCid. Such fuzzy hash value could be incorporated into the pre-KYCid directly or in tokenized form. Preferably, the KYCid that is posted to the blockchain or another decentralized platform, as associated privately with the pre-KYCid, serves as a constant reference point across all wallets of a given User 110 (with the potential exception of deactivation). In an alternative embodiment, KYCid is set equal to or otherwise derived directly from pre-KYCid.

Attributes to be queried, perhaps dependent on dataType, are such that the Attribute Values may be attested to in raw or tokenized form. If the Attribute Value must be in tokenized form, the raw attribute intervals, as included in Table 1, go through the tokenization process at 165 where the KYC Processor 120 works with the Attributes Registry/Coordinator 125 to produce these tokens, referred to herein as Blockchain Tokens, along with any tokens needed to produce the KYCid as described above. If an Attribute Value is to be attested to in tokenized form, the Attributes Registry/Coordinator 125 computes the final Attribute Value at 175. One embodiment is as Attribute Value=$f_1(f_2(\text{KYCid}\|\text{Nonce}),$ Blockchain Token) for functions $f_1$ and $f_2$ as included in Table 1, where Blockchain Token represents an interval of data of the specified dataType, as included in Table 1, and the resulting Attribute Value is denoted as a User-specific Token, as generated by combining a Blockchain Token that represents an interval of values of an attribute with User-specific information, e.g., as selected by a Proxy or sub-Proxy. Such interval of values of an attribute may be comprised of a plurality of intervals each of which contains at least one value of an attribute or may be comprised of a single such interval. In one embodiment depicted here, $f_1(f_2(\text{KYCid}\|\text{Nonce}),$ Blockchain Token)=pP where p=an elliptic curve scalar representation of Blockchain Token used as a scalar multiplier, $f_1(P,$ Blockchain Token)=elliptic curve point resulting from scalar multiplication of pP, and $f_2(\text{KYCid}\|\text{Nonce})$=P=an elliptic curve point representation of hash(KYCid\|Nonce). $f_2$(KYCid- ‖Nonce) may alternatively be replaced by $f_2$(KYCid‖NonceSig*), where, for example, NonceSig* is hash(hash(NonceSig)‖UpdateIndex). NonceSig* (but preferably not NonceSig) would be provided by the User's client to a Proxy or sub-Proxy that represents the intended MSB. NonceSig* is available to the Coordinator via its knowledge of hash (NonceSig) and UpdateIndex. Preferably any particular Proxy or sub-Proxy remains unaware of NonceSig* values for which it has no legitimate use in handling a User-initiated Query. Other possible embodiments are as Attribute Value=hash(KYCid‖Nonce‖Blockchain Token) or Attribute Value=hash(KYCid‖NonceSig*‖Blockchain Token). As examples, a Blockchain Token may be representative of a zip code, a range of zip codes, or a range/interval of credit scores. Preferably, Blockchain Tokens are constructed using a Coordinator HMAC key that is different than that used for other purposes, such as for the generation of pre-KYCid values, where application of such HMAC key constitutes the final step of tokenization resulting in a Blockchain Token. Both KYCid and Blockchain Token tokenization processing between the KYC Processor 120 and the Attributes Registry/Coordinator 125 are shown in more detail in FIG. 12 and FIG. 13. In summary, at least two types of tokenization can be deployed, resulting, e.g., in a KYCid or in a Blockchain Token, respectively. KYCid values are posted to the blockchain or another decentralized platform, while Blockchain Tokens are encapsulated within an outer token a function of which is posted to the blockchain or another decentralized platform. As an example of the latter, $f_1(f_2$(KYCid‖Nonce), Blockchain Token) or $f_1(f_1$(KYCid‖NonceSig*), Blockchain Token) may be considered such outer token denoted as a User-specific Token, where the posted Attestation comprises a function of, in particular, $f_1(f_2$KYCid‖Nonce), Blockchain Token) or $f_1(f_2$(KYCid‖NonceSig*), Blockchain Token) as an Attribute Value. Preferably, tokenized data (whether resulting, e.g., in a KYCid or a Blockchain Token) is blinded from access by at least one of the following: the Coordinator as coordinating network element, and at least one network element (such as a Backend, Translator or Coprocessor) serving as intermediary between at least one requesting network element and the Coordinator. The outer token, a function of which is posted to the blockchain or another decentralized platform, is used to represent a subset of values as assigned to a specific User, e.g., wherein raw attribute intervals are assigned in accordance with an application-specific policy. As an alternative to the KYC Processor's request for tokenization processing of KYCid occurring at 165 and computation of Selected PII TOKENS occurring at 170, in some embodiments this request and computation occurs sooner in order to enable the results to be compared against entries within the Attributes Registry database as part of the User vetting/Verification process. The outer token represents a User-personalized assignment of an interval of values of an attribute.

The Attributes Registry/Coordinator 125 generates the following at 180 (as defined in Table 1 as Attestation example (a)): Attestation=hash(KYCid‖NonceSigKD‖hash (hash(WalletSig)‖WalletAddress)‖Attribute Value) where NonceSigKD is generated by the Attributes Registry/Coordinator 125 using hash(NonceSig) as a key derivation key, e.g., such that NonceSigKD=hash(dataType‖Update Index‖hash(NonceSig)), as these expressions for Attestation and NonceSigKD are included in Table 1. UpdateIndex in this case will be 0 as it is the first Attestation corresponding to the specified dataType and Nonce, and therefore has not gone through any updates. In an alternative embodiment, i.e., one in which redundancy of KYCid and hash(hash (WalletSig)‖WalletAddress) both as Attestation metadata and as part of Attestation computation is not warranted, Attestations can be formulated as Attestation=hash(NonceSigKD‖Attribute Value). In either formulation of Attestations, the Attestation can be interpreted as a one-way function of NonceSigKD, and NonceSigKD, in turn, as a one-way function of NonceSig in the form of a key derivation function with key derivation key hash(NonceSig), so as to shield against attempts to determine the Attribute Value from an Attestation without the benefit of knowledge of NonceSigKD even given one or more values of NonceSigKD for the same key derivation key hash(NonceSig) but where at least one of dataType and UpdateIndex differs from those underlying the targeted NonceSigKD. The posting of an Attestation by the Attributes Registry/Coordinator 125 at 185 results in KYC Smart Contract 130 state that maps together the following: hash(hash(WalletSig)‖WalletAddress)) (as computed by the Attributes Registry/Coordinator 125 from hash(WalletSig) and WalletAddress), dataType, Attestation (as computed by the Attributes Registry/Coordinator 125), Nonce, KYCid and a timestamp. The Attributes Registry/Coordinator 125 sends the Attestation within a blockchain transaction at 185 that is verifiable using a signature verification public key that is authenticated within the code of the KYC Smart Contract 130. The authenticated and publicly available Coordinator's public key is used by the KYC Smart Contract 130 to verify the native blockchain signature/native transaction signature tied to the sender.

With reference to FIG. 1 in particular, by one approach, the Coordinator, as a coordinating network element, receives from a requesting network element directly or as routed through at least one network element that serves as intermediary between at least one requesting network element and the Coordinator, an attestation request that results from processing a user request to register a wallet/key-pair-enabled app that is a decentralized platform-compatible wallet/key-pair-enabled app as being associated with a user profile populated by off-platform-determined values of an attribute. Further, the Coordinator attests to an Attribute Value, as derived from one or more such off-platform-determined values of the attribute, and does so via submission of one or more transactions to a blockchain or another decentralized platform as a recognized source of one or more Attestations.

With further reference to FIG. 1 in particular, by one approach, the requesting network element submits a tokenization request as part of the attestation request, which results in access by the Coordinator to a Platform Token that is combined with User-specific information by the Coordinator for incorporation into the Attestation.

With further reference to FIG. 1 in particular, by one approach, the requesting network element submits the tokenization request independently of any application-specific policy.

With further reference to FIG. 1 in particular, by one approach, the User-specific information is represented as an elliptic curve point and the Platform Token is represented as a scalar multiplier.

With further reference to FIG. 1 in particular, by one approach, the attestation request includes at least one value comprised of a function of data, resulting in posting to the blockchain or to another decentralized platform at least one of: (1) a resultant value derived as a first tokenized form of the data; (2) a resultant value that is independently generated and that is associated within a database accessible to the Coordinator with a second tokenized form of the data, which may be the same as or different than the first tokenized form of the data, if any.

With further reference to FIG. 1 in particular, by one approach, the resultant value represents at least one of: (1) a constant reference point across all wallets/key-pair-enabled apps of a User except for wallets/key-pair-enabled apps of the User, if any, for which cross-wallet association to the User has been deactivated; (2) a User-personalized assignment of an interval of values of the attribute.

With further reference to FIG. 1 in particular, by one approach, the resultant value is a User-specific Token that is generated by combining a Platform Token, which represents an interval of values of the attribute, with User-specific information.

Referring now to FIG. 2, for each Signed Nonce tuple submitted to the KYC Processor by a User as part of a request in FIG. 1, the KYC Processor verifies its current validity and retains the Nonce until its expiration in order to detect and reject attempted resubmission/replay at 205 in FIG. 2. If the Nonce_validity_period is currently valid and the Nonce is not in the KYC Processor's current storage as previously presented, the KYC Processor verifies Sign (Nonce; Nonce_validity_period) by regenerating it (using its own HMAC key or signature generation private key) and checking for a match or by verifying it using its own signature verification public key. The KYC Processor verifies WalletSig using WalletPubKey and WalletAddress as derived from WalletPubKey. The KYC Processor verifies NonceSig using WalletPubKey and the Nonce from the presented Signed Nonce tuple. If any of these verifications fail, the KYC Processor notifies the User that validation failed at 210 by returning an error in FIG. 1 at 155.

Upon successful verification at 205, the KYC Processor uses appropriate $3^{rd}$-party service, referred to herein as Identity Verification Service 220, to vet the User-supplied personal information/identification at 215. If the User fails the Identity Verification at 215, the KYC Processor notifies the User that their KYC process failed at 225 by returning an error in FIG. 1 at 155. Upon successful verification at 215, the KYC Processor proceeds to retrieve information/ values of an attribute, e.g. credit data at 230 which will be attested to from a $3^{rd}$ party data source, e.g. Credit Reporting Agency 235. Such values of an attribute may indicate KYC status (e.g., PASS, FAIL or AML) or more granular information. Upon receipt of the information, the KYC Processor progresses to 150 in FIG. 1.

Figure 3:
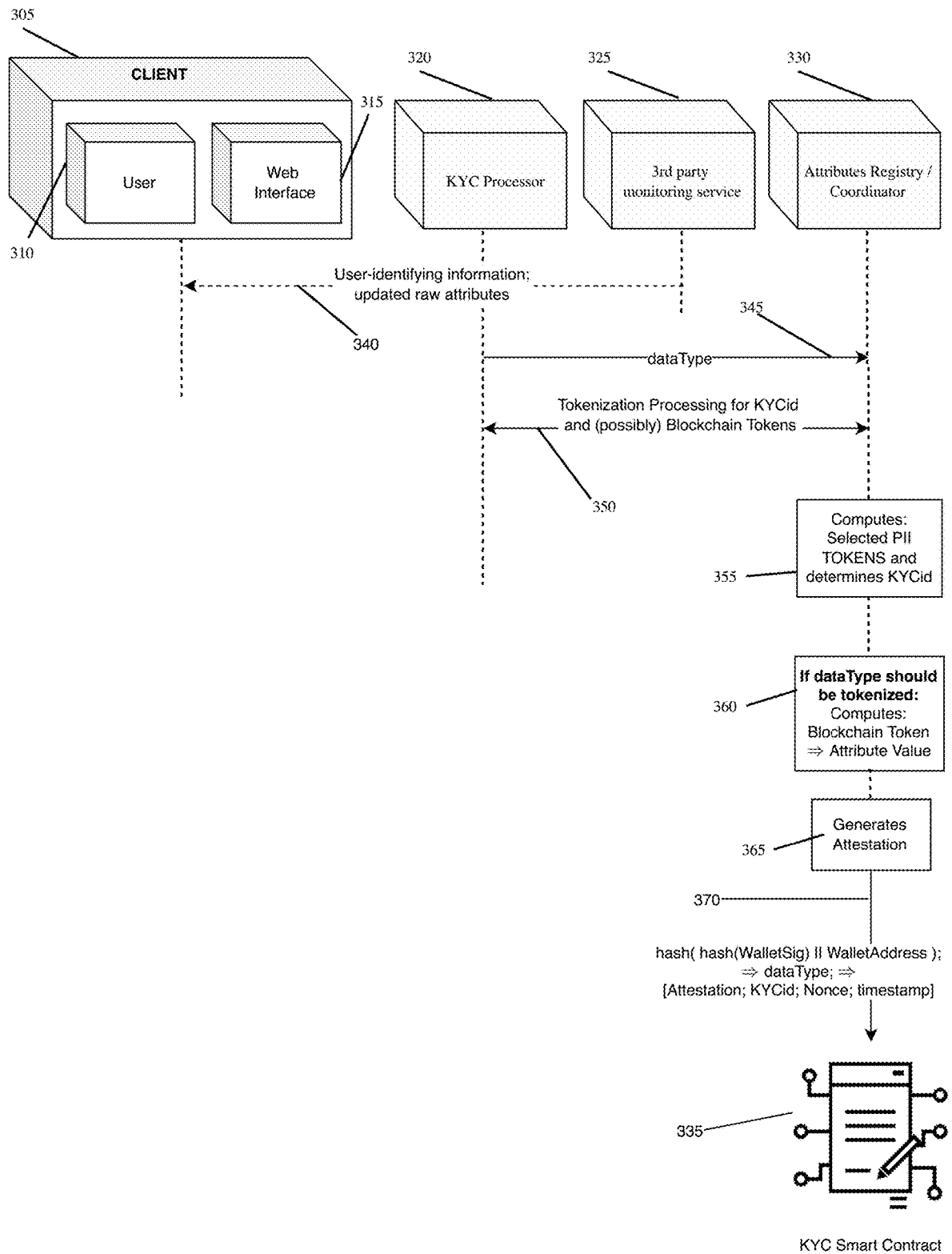
FIG. 3 comprises a flow diagram as configured in accordance with various embodiments of these teachings and that illustrates Attestation updating (resulting in an Attestation) to enable more accurate corroboration and transference, including communication with a KYC Processor, Coordinator (as an element of an Attributes Registry) and KYC Smart Contract as part of Attestation Update activity. Note that Attestation updating to enable more accurate corroboration and transference does not imply that corroboration and/or transference ultimately occurs. The transmissions depicted in FIG. 3 may include an overlay, such as encryption that is subsequently decrypted, that is not explicitly shown.

Referring now to FIG. 3, updates can be attested to by the Attributes Registry/Coordinator 330 without involving the User 310. In FIG. 3, Client 305, User 310, and Web Interface 315 are as introduced as 105, 110 and 115, respectively, in FIG. 1. If the Attributes Registry/Coordinator 330 retains the information pertaining to its Attestations, it can re-attest prior to or subsequently to the User 310 having initiated a Query. A $3^{rd}$ party monitoring service 325 submits User-identifying information and updated raw attributes to the KYC Processor 320 at 340. In addition, for any given dataType attested to on behalf of a User 310 that warrants an update, updates are preferably posted for all wallets associated with this User 310 which the specified dataType has been attested at 340. This prevents circumvention by the User 310, while still allowing the User 310 to query against all of its registered wallets.

At 345, the KYC Processor 320 transmits to the Attributes Registry/Coordinator 330 one or more dataTypes in need of updating. In addition, at 350, data is provided by the KYC Processor 320 to the Attributes Registry/Coordinator 330 in order to result in a KYCid value to be associated with the posted Attestation as well as Blockchain Tokens to become Attribute Values if necessary, possibly dependent on the dataType. The KYC Processor 320 requests tokenization of selected data (which may be PII data) that corresponds to the User 310. This tokenization processing at 350 is shown in more depth with two possible embodiments in FIG. 12 and FIG. 13, respectively. The Attributes Registry/Coordinator 330 computes the pre-KYCid at 355, potentially using Selected PII TOKENS as in one embodiment in which pre-KYCid=HMAC(KYC_HMAC_KEY, hash(Selected PII TOKENS)) and the KYCid is the correlating random value held in the Coordinator database. Perhaps dependent in particular on dataType, the attributes to be queried are such that the Attribute Values may be attested to in raw or tokenized form. If an Attribute Value is to be attested to in tokenized form, the Attributes Registry/Coordinator 330 computes the final Attribute Value at 360. One embodiment is as Attribute Value=$f_1(f_2$(KYCid||Nonce), Blockchain Token) or as Attribute Value=$f_1(f_2$(KYCid||NonceSig*), Blockchain Token), where Blockchain Token represents an interval of data of the specified dataType.

The Attributes Registry/Coordinator 330 generates the following at 365: Attestation=hash(KYCid||NonceSig KD||hash(hash(WalletSig)||WalletAddress)||Attribute Value), or perhaps alternatively as Attestation=hash(NonceSigK-D||Attribute Value), where NonceSigKD is generated by the Attributes Registry/Coordinator 330 using hash(NonceSig) as a key derivation key, e.g., NonceSigKD=hash(data-Type||UpdateIndex||hash(NonceSig)). Each time an update of the same KYCid, Nonce and dataType occurs, the UpdateIndex should be increased. If UpdateIndex is included, even in the case where Attribute Values are exhaustible, then property (6) as described herein still holds. The posting of an Attestation by the Attributes Registry/Coordinator 330 at 375 results in KYC Smart Contract 335 state that maps together hash(hash(WalletSig)||WalletAddress)) (as computed by the Attributes Registry/Coordinator 330 from hash(WalletSig) and WalletAddress), dataType, Attestation (as computed by the Coordinator 330), Nonce, KYCid and a timestamp. The Attributes Registry/Coordinator 330 sends the Attestation within a blockchain transaction at 370 that is verifiable using a signature verification public key that is authenticated within the code of the KYC Smart Contract 335. The authenticated Coordinator's public key is used by the KYC Smart Contract 335 to verify the native blockchain signature tied to the sender.

Because of the enforced sequential nature of writes-to and reads-from the blockchain that can assure determined access to the most-recently posted Attestation of a given dataType associated to any given Nonce and to the most-recently posted Nonce associated to any given wallet- and dataType-pair, an attempt by a User 310 to query against a more favorable, albeit outdated, Attestation can be thwarted.

The system performs properly whether it is configured to post Attestations for all current dataTypes for the wallet using the new Nonce if a User 310 registers one of their previously registered wallets, or only new dataTypes that were not previously associated with the User's wallet. In the former case, for any given wallet the User will only have to retrieve a single Nonce that will be consistent across all dataTypes. Attesting to one or more Attribute Values can occur as updating of previous attesting to Attribute Values and can occur as a result of monitoring activity (possibly in lieu of a User request) wherein such monitoring activity may be conducted by a third-party entity that is distinct from the network elements of the core system. To the extent that KYC Processor (original or update) Attestation requests made to the Coordinator are digitally signed by the KYC Processor, these may be archived by the Coordinator as auditable evidence of the Coordinator not acting independently of the KYC Processor. In some embodiments, Attestations generated as update Attestations handled without User involvement may be focused primarily on aspects that are deleterious to a User's reputation while the User may be held responsible to register one or more of their previously registered wallets to ensure that aspects that favor their reputation are made available as Attestations. In other embodiments there may be no practical reason for a User to engage in reregistration of wallets. An exception to that may be a case in which a User has reason to have one or more of their wallets reassigned to a previously used KYCid in order to reverse the effect of an earlier deactivation, where such previously used KYCid and its association with the wallet is available from the blockchain even if its pairing to a pre-KYCid had been deleted from the Coordinator-accessible database. As shown in the extension of 340 back to the Client 305 from the KYC Processor 320 or end-to-end from a 3$^{rd}$ party monitoring service 325, the Client 305 may become aware of updates either synchronously with the update or at a later time upon pulling of such update information by the Client 305 prior to mounting a Query. This offers utility, in particular, in preventing false negatives during Query that could be caused by a Client providing outdated information to a Proxy on behalf of a User.

Attestations can subsequently be queried against. Thus, herein is described a method for enabling solely on-platform vetting, on a blockchain platform or on another decentralized-execution-based platform, of Users at a time of a Query against an Attestation, the method comprising: by a coordinating network element (e.g., a Coordinator) that manages a protocol: via off-chain/off-platform communications, receiving from a requesting network element (e.g., a KYC Processor) directly or receiving as routed through at least one network element (e.g., elements of an Attributes Registry such as a Backend, Coprocessor or Translator that serves as intermediary between at least one requesting network element and the coordinating network element) an Attestation request that results from processing a User request to register a decentralized platform-compatible wallet as being associated with a User profile populated by off-platform-determined values of an attribute; and attesting to an Attribute Interval, as one or more such values of an attribute, via submission of one or more transactions to a blockchain or another decentralized platform as a recognized source of Attestations. In one approach, access to the blockchain or another decentralized platform involves execution of blockchain- or another decentralized platform-code (e.g., a smart contract), where the execution utilizes the response to the Query in at least one of the following: an application determining its response to a User request-for-service, and as a component of a decentralized finance application. There may be two smart contracts involved, wherein a User directly (or via a Proxy) communicates by posting a transaction to an MSB Smart Contract that, in turn, invokes a KYC Smart Contract via which Attestations have been made by the Coordinator. Alternatively, the application processing may be handled by a centralized service broker rather than an MSB Smart Contract. The utilized blockchain or another decentralized ledger or other platform may be public or private or a combination thereof.

With reference to FIG. 3 in particular, by one approach, the attesting to the Attribute Value occurs as an updating of a previous attesting to the Attribute Value, as a result of monitoring activity conducted by a third-party entity.

Figure 16:
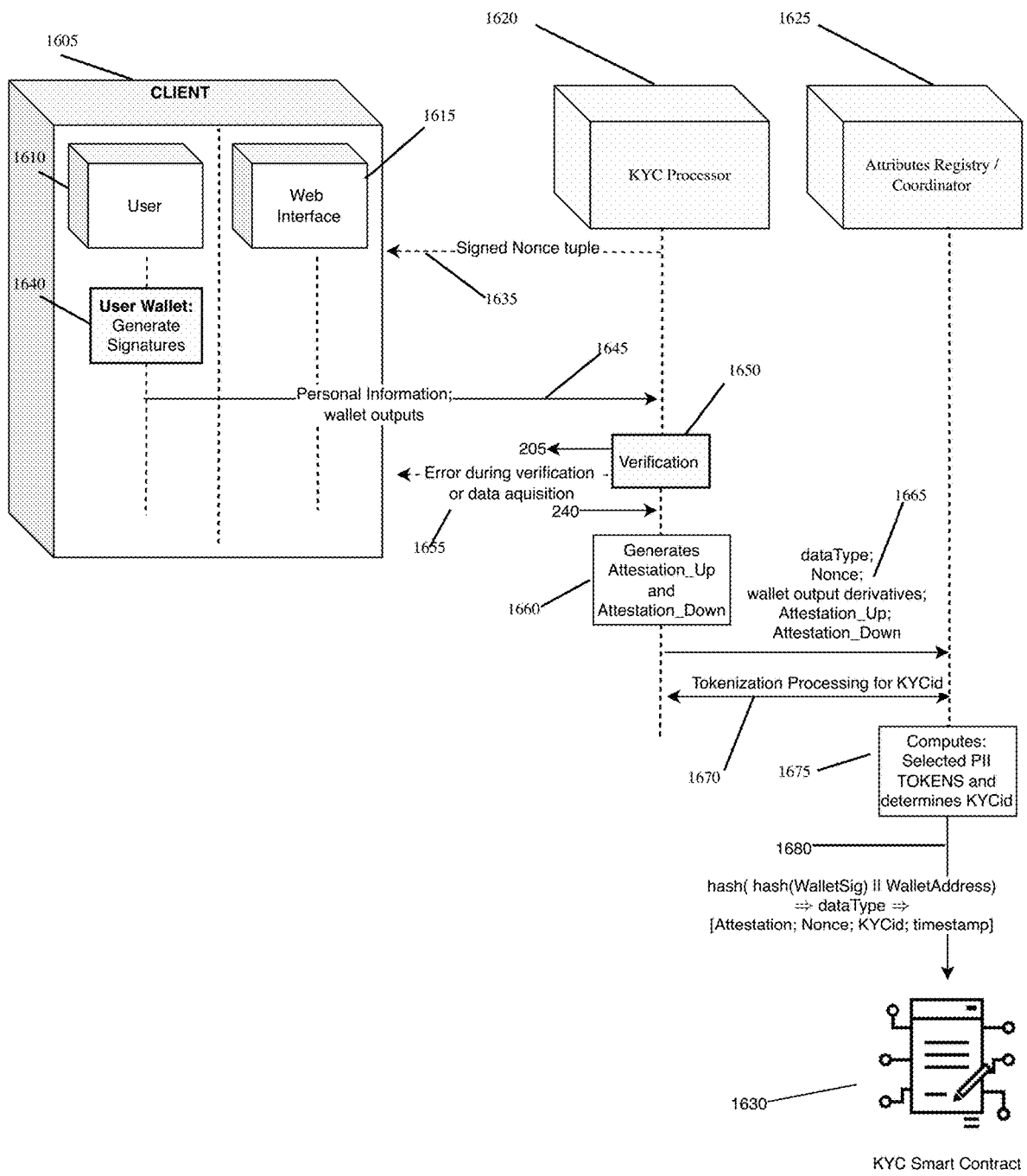
FIG. 16 comprises a flow diagram as configured in accordance with various embodiments of these teachings and that illustrates an embodiment of attesting by hiding a User-personalized assignment of an interval of values of an attribute to enable corroboration and transference, including communication with a Client, KYC Processor, Coordinator (as an element of an Attributes Registry) and KYC Smart Contract as part of Attestation activity. Note that attesting by hiding a User-personalized assignment of an interval of values of an attribute to enable corroboration and transference does not imply that corroboration and/or transference ultimately occurs. The transmissions depicted in FIG. 16 may include an overlay, such as encryption that is subsequently decrypted, that is not explicitly shown. It is to be understood hereinafter that a Client may operate on behalf of a User. In the case of a machine as User, the User may be hosted on a Client or the User and Client may be one and the same.

Referring now to FIG. 4, a User 406 via a Client 403 may query against the Attestations and updates made in FIG. 1, FIG. 3, and FIG. 16. In FIG. 4, Client 403, User 406, and Web Interface 409 are as introduced as 105, 110 and 115, respectively, in FIG. 1. There are three different possible pathways described in FIG. 4, and in further detail in subsequent figures: pathway 421 is described in detail by two different methods in FIG. 5 and FIG. 17, respectively, where no Proxy 415 is used; pathway 424 is described in detail in FIG. 8 and FIG. 10 where a Proxy 415 is used and the native signature (e.g., native blockchain signature/native platform signature/native transaction signature) is generated by the Proxy 415 rather than the User 406 (or, more specifically, a wallet associated with the User); pathway 427 is described in detail in FIG. 9 and FIG. 11 where a Proxy 415 is used and the native signature is generated by the User's wallet rather than the Proxy. The arrow 430 is used in all three pathways in order to represent portions of the flow that happen in every pathway.

Figure 17:
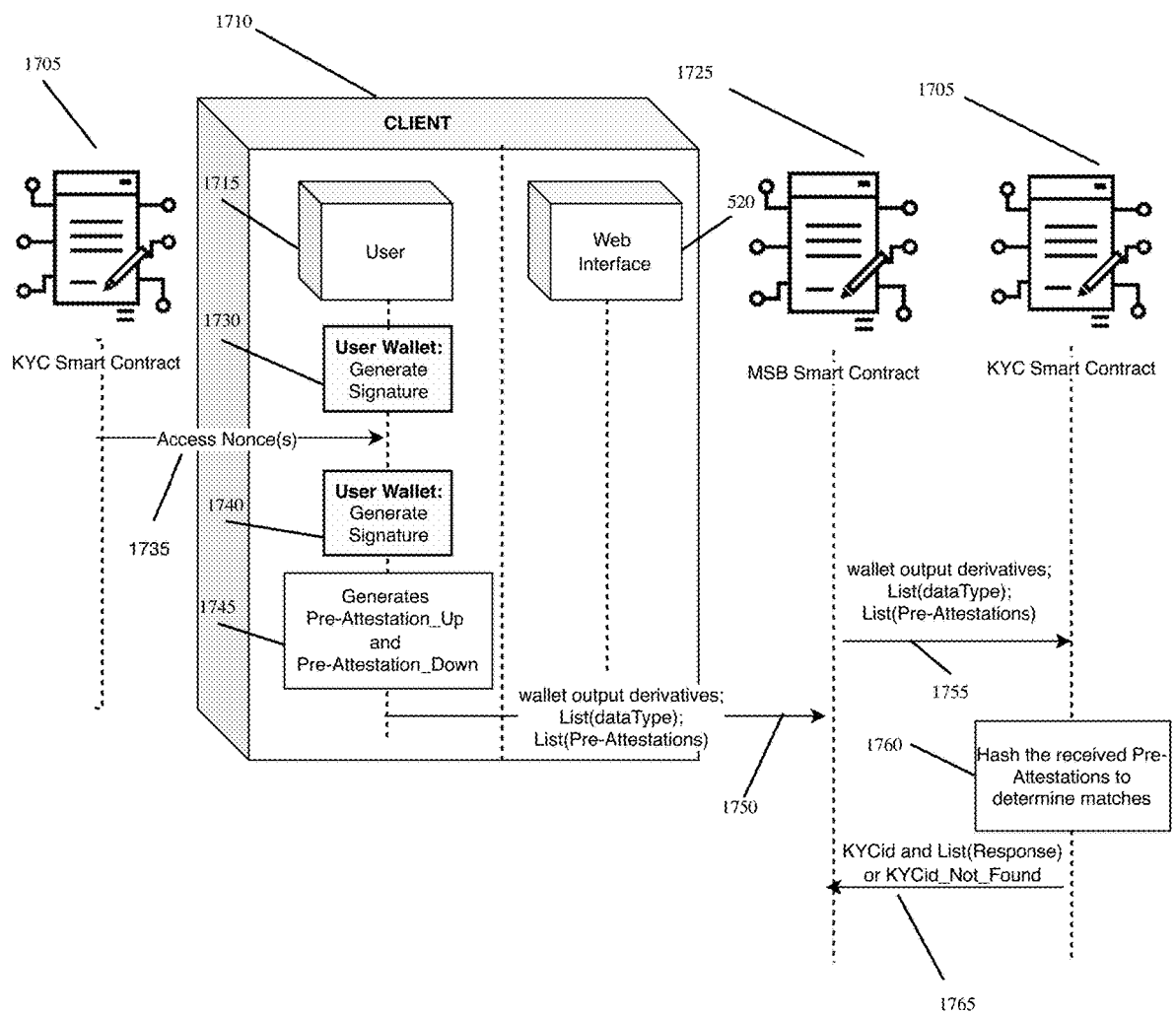
FIG. 17 comprises a flow diagram as configured in accordance with various embodiments of these teachings and that illustrates of a method of performing a Query for the purpose of data corroboration by utilizing upper and lower bounding of intervals, including communication with a Client, KYC Smart Contract and MSB Smart Contract. The transmissions depicted in FIG. 17 may include an overlay, such as encryption that is subsequently decrypted, that is not explicitly shown.

The Client 403 may query directly with the MSB Smart Contract 418 as in pathway 421 in which no communication with or use of the Proxy takes place. This occurs either if there are no Attribute Values that must be represented as Blockchain Tokens and therefore only submit the raw attribute value (which is the case shown in FIG. 5), or where hash chains are utilized to compute Attestation_Up and Attestation_Down (as shown in FIG. 17), where these terms are as included in Table 1.

In this case, the Client 403 retrieves necessary information from the KYC Smart Contract 412 (as the Client 403 must do in every flow described in FIG. 4) and submits directly to the MSB Smart Contract 418, and therefore uses a native transaction signature at 436. This is followed by the communication between MSB Smart Contract 418 and KYC Smart Contract 412 to perform the Query, determine matches and send results back at 439 and 442. Communications 439 and 442 (as with communication 433) take place in every Query flow reflected in FIG. 4.

If the use of Blockchain Tokens to obscure the raw attribute value is necessary (possibly dependent on the dataType), the Client 403 may utilize a Proxy 415 as in pathways 424 and 427. In pathway 424, the Client 403 sends the Proxy 415 their signed package at 445 to include, among other data, transactional information. However, this signature is not the native transaction signature, but a signature that is then, in turn, incorporated into what is signed by the Proxy after performing the rest of the Proxy 415 processing (e.g. the retrieval of nonces and other such information at 448). The Proxy 415 signature is generated as a native transaction signature. This outer signature is included in what is sent in 451. This is followed by the communication between MSB Smart Contract 418 and KYC Smart Contract 412 to perform the smart contract-to-smart contract invocation aspect of the Query, determine matches and send results back at 439 and 442. This pathway is also shown in further detail in FIG. 8 and FIG. 10.

In pathway 427, the Client 403 signs their package to go to the Proxy 415 at 454 for the purpose of an audit trail, however, this signature is not the inner signature sent in 445 and it is not the native transaction signature in 451. The Proxy 415 performs processing (e.g. the retrieval of nonces and other such information at 457). The Proxy 415 in this case generates the inner signature over the arguments of the package sent back to the Client in 460. The Client 403 now includes the Proxy 415 signature as an argument of the outer signature along with the transactional information and any other information that was to be kept from the Proxy 415 at the earlier stage. Additionally, if payment for the KYC Query service is incorporated into the User-level transaction, this serves as a disincentive for a malicious User to attempt to drain an MSB account. The outer signature is the native transaction signature sent in 463. This pathway is also shown in further detail in FIG. 9 and FIG. 11.

The Proxy-based subsystem could be layered on at a later time if starting off with a more basic system is desired. Once the Proxy-based and direct User-to-MSB Smart Contract subsystems both exist, Users could get the opportunity to opt in to (or continue to) have their data exposed to the blockchain using the original/non-Proxy-based system. A User, or, more specifically, a Client, may routinely use a Proxy for all dataTypes, including those that do not require utilization of Blockchain Tokens.

Referring now to FIG. 5, a User 515 accesses their wallet of interest via a Client 510 at 530 in order to generate WalletSig (via application of the wallet private key), which when hashed and combined with WalletAddress produces hash(hash(WalletSig)||WalletAddress). The resultant hash value, along with the dataTypes in the selected List(dataType), serves as a pointer to the Attestations on the blockchain which the MSB Smart Contract is instructed to query against (where the Client 510 accesses the relevant Nonces at 535). In FIG. 5, Client 510, User 515, and Web Interface 520 are as introduced as 105, 110 and 115, respectively, in FIG. 1.

The User 515 computes List(NonceSigKD), where NonceSigKD=hash(dataType UpdateIndex||hash(NonceSig)) for NonceSig values generated by the User's wallet private key at 540 for each Nonce retrieved from the blockchain as corresponding to an Attestation of interest. The enabling of solely on-platform vetting, on a blockchain platform or on another decentralized-execution-based platform, of User 515 at a time of a Query against an Attestation comprises at least one of the following: (a) a User 515 request to register a wallet comprising generation by the wallet of at least one deterministic digital signature (e.g., NonceSig) a function of which is derived by the requesting network element (i.e., a KYC Processor) or the coordinating network element (i.e., the Coordinator) and incorporated into an Attestation, and (b) a User-initiated Query request involving a User 515 retrieving information via a Client 510 from the blockchain or another decentralized platform over which at least one deterministic digital signature (e.g., NonceSig) is regenerated by the wallet designated by an Attestation (i.e., via hash(hash(WalletSig)||WalletAddress)) against which a Query is conducted. The function may be a one-way function. Further, the function may incorporate additional arguments such as the dataType of the attribute and a counter value, as is the case for NonceSigKD=hash(dataType||UpdateIndex||hash(NonceSig)) where UpdateIndex denotes such counter value. The Query to the MSB Smart Contract 525 is submitted by the User 515, via a Client 510 and the native transaction signature is generated by application of the User's wallet private key. The body of the transaction at 545 includes WalletPubKey, wallet output derivatives, List(dataType) and List(NonceSigKD) where wallet output derivatives herein refers to hash(WalletSig) and WalletAddress. WalletPubKey is usable to verify the transaction signature. In the configuration of some embodiments, WalletPubKey need not be explicitly sent in that it is retrievable from other sent information such as including the message and the signature computed over the message.

The execution of the MSB Smart Contract 525 code includes verification of the User's wallet-generated transaction signature. For Queries to the KYC Smart Contract 505 by the MSB Smart Contract 525, no associated signature (native or otherwise) is required since this is a smart contract-to-smart contract invocation. The Query to the KYC Smart Contract 505 at 550 includes wallet output derivatives, List(dataType), List(NonceSigKD), and Attribute Values for those dataTypes for which explicitly sending the Attribute Value as opposed to the KYC Smart Contract searching over possible Attribute Values is warranted.

The KYC Smart Contract 505 utilizes hash(WalletSig) and WalletAddress to attempt to locate Attestations via hash(hash(WalletSig)||WalletAddress). The most recently posted Attestation of each dataType within List(dataType) is chosen for re-computation of the Attestation in order to check for a match. If MSB Smart Contract 525 had included as an argument of 550 particular Attribute Values, then the KYC Smart Contract 505 forms the Attestation using the given Attribute Value(s) and checks for a match given this value at 555. If an Attribute Value is not supplied for the given dataType, KYC Smart Contract 505 performs an exhaustive search over possible Attribute Values of the dataType at 560 (where not all such possible Attribute Values need to be utilized if a match has already been found). This exhaustion by the KYC Smart Contract code execution is applicable only to dataTypes for which Attestations were originally constructed by the Coordinator using raw attribute values as Attribute Values (and where the MSB Smart Contract does not supply the Attribute Values directly to the KYC Smart Contract). If the KYC Smart Contract 505 is able to find a match on the dataType, it returns Yes or No, respectively, dependent on affirmative match or not, in response to an Attribute Value submitted at 555, or, per 560, it returns the matched value found via attempted exhaustion or No, respectively, dependent on affirmative match or not. If there was a match on the KYCid, but not on a dataType, the KYC Smart Contract 505 returns a dataType_Not_Found error. If there was no match on the KYCid at all, the KYC Smart Contract 505 returns a KYCid_Not_Found error at 565.

Optional deployment of Proxies (whether of an uber/unterProxy nature or as one monolithic Proxy) enables a privacy-enhanced capability to validate that one or more User Attribute Values satisfy application/MSB-specific range or subset requirements (e.g., pertaining to credit scores or zip codes), without exposing the granular data to the (possibly public) immutable blockchain. Preferably, KYC Processors, the Attributes Registry, MSB Smart Contracts and the KYC Smart Contract can each operate without awareness (such as through potentially relatively static coding in the case of smart contracts) of application/MSB-specific policies (also denoted as application-specific policies), which can change dynamically, without sacrificing the capability to usefully validate (or reject) Attestations through Query. Preferably, Users can opt in or out of such a granular-data-suppression system without affecting their capability to meet application/MSB-specific (i.e., application-specific) KYC requirements for service fulfillment.

Figure 8:
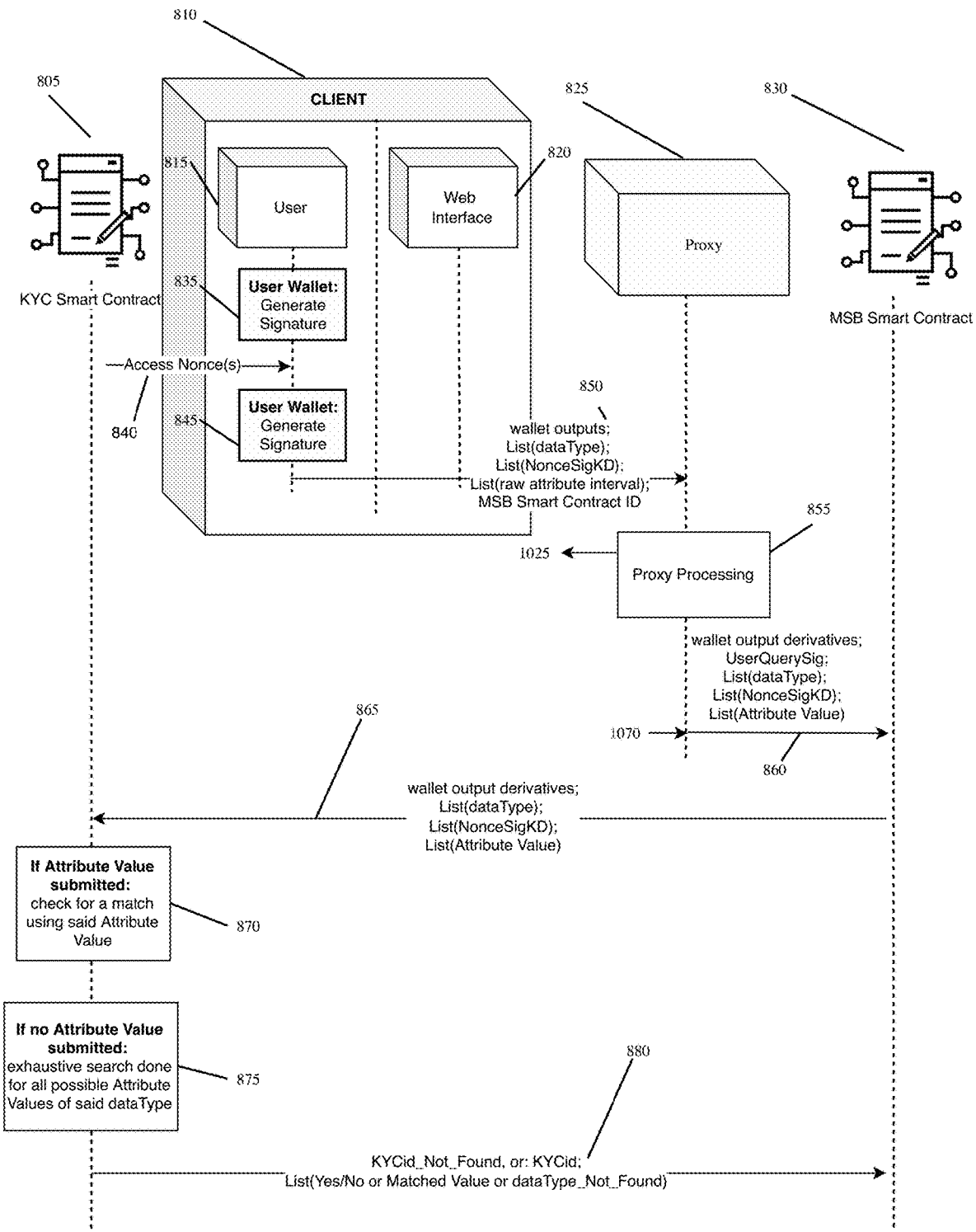
FIG. 8 comprises a flow diagram as configured in accordance with various embodiments of these teachings and that illustrates a method of performing a Query for the purpose of further-blinded data corroboration, including communication with a Client, Proxy, KYC Smart Contract and MSB Smart Contract. The transmissions depicted in FIG. 8 may include an overlay, such as encryption that is subsequently decrypted, that is not explicitly shown.

The Proxy may be split into component hierarchical sub-Proxies, described herein as an uberProxy and unterProxy configuration in which the uberProxy communicates with the Client and MSB Smart Contracts in the case of FIG. 8, and the unterProxies are in possession of the Blockchain Tokens used to compute the Attribute Values while being at least transiently blinded by the uberProxy from access to User-specific information. There may exist a single uber- Proxy (or a plurality of centrally-managed uberProxies), or they may be MSB-specific as potentially managed by the MSB or delegated by the MSB for management. Each unterProxy possesses all of the Blockchain Tokens for a given dataType, however, there may be multiple unterProxies in charge of the same dataType in which case an MSB would be able to provide a preference for which unterProxies it would like the uberProxy to utilize in processing. Although all of these uberProxies and unterProxies may be expandable as described, they may also be collapsed into a single processor or any combination of the above. For clarity in explanation, the description and figures depict an expanded system, as any collapsing as described will simply reduce the design without adding other elements. Herein, dataTypes may be further divided into granular dataTypes. For example, a dataType comprised of zip code information may be divided into subordinate dataTypes corresponding to geographical regions. In some embodiments, the generation of Blockchain Tokens may take into account dataType so as to avoid or at least reduce the potential for Blockchain Token values to span over multiple dataTypes, i.e., to avoid collisions of Blockchain Token values across dataTypes.

Blockchain Tokens are described more fully below relative to their use by Proxies when running the Proxy versions of the MSB Query flow as reflected in FIG. 8, FIG. 9, FIG. 10, and FIG. 11. As described above, the MSB Query Flow that utilizes direct communications between a User and an MSB Smart Contract as shown in FIG. 5 (without routing through a Proxy) does not make use of Blockchain Tokens. A Proxy can handle both types of Queries, i.e., those that involve interjection of a Blockchain Token as well as those that do not because Attribute Values are incorporated by the Coordinator into Attestations in their raw form. It is possible that in a given run of Query involving a Proxy, there is no need for the Proxy to interject Blockchain Tokens. A Proxy submits values derived as outer tokens (i.e., as Attribute Value=$f_1(f_2(KYCid\|Nonce)$, Blockchain Token)) or $f_1(f_2(KYCid\|NonceSig^*)$, Blockchain Token)) or a function thereof to the blockchain or another decentralized platform as representative of a User-initiated Query request. These outer tokens $f_1(f_2(KYCid\|Nonce)$, Blockchain Token) or $f_1(f_2(KYCid\|NonceSig^*)$, Blockchain Token) may be referred to as User-specific Tokens, as before the function of KYCid and Nonce (or NonceSig*) is applied the Blockchain Tokens are purely deterministic dependent on only the dataType and raw attribute interval for that dataType.

With reference in particular to FIG. 1 and FIG. 5, respectively, by one approach, at least one of the following applies: (1) a user request to register the wallet/key-pair-enabled app comprises generation by the wallet/key-pair-enabled app of a deterministic digital signature as one of at least one deterministic digital signature a function of which is derived, as a function of the deterministic digital signature, by the requesting network element or the Coordinator and incorporated into the Attestation; (2) a User-initiated Query request involves retrieval of information by the User from the blockchain or another decentralized platform over which at least one deterministic digital signature is regenerated by the wallet/key-pair-enabled app that is designated by the Attestation.

Referring now to FIG. 6, this figure depicts an embodiment that shows a pre-computation of Blockchain Tokens between a KYC Processor 605 and the Attributes Registry/Coordinator 615. This flow occurs in the event that a pre-computation of a set of [dataType, raw attribute interval, Blockchain Token] tuples for Proxies to receive upon setup as in FIG. 7 for specific dataTypes is considered desirable.

In one embodiment, this could be all the possible credit score intervals and their corresponding Blockchain Tokens. The KYC Processor 605 blinds all possible raw attribute value or raw attribute intervals for a given dataType at 625 in order to request tokenization processing for these values at 635. This tokenization processing at 635 is shown in more depth with two possible embodiments in FIG. 12 and FIG. 13, respectively. The KYC Processor 605 records the shuffling/permutation for each dataType at 630 in its KYC Database 610, if such statefulness is acceptable. This permutation may instead be reconstructable by means of using a keyed function (e.g. HMAC) on the dataType and a securely held key. The Attributes Registry/Coordinator 615 records all the Blockchain Tokens in the received order at 640 in the Attributes Registry Database 620 for communication to Proxies as shown in FIG. 7.

Figure 7:
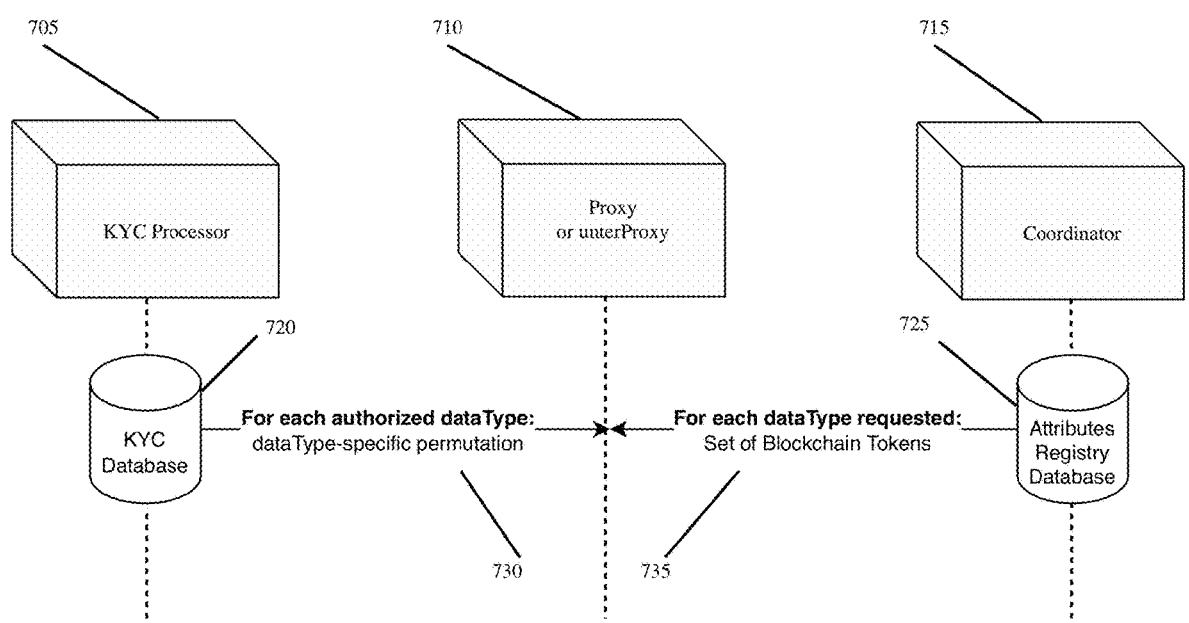
FIG. 7 comprises a flow diagram as configured in accordance with various embodiments of these teachings and that illustrates transmission of Blockchain Tokens as a setup process for future use, including communication with a Proxy (of some type), KYC Processor and Coordinator. The transmissions depicted in FIG. 7 may include an overlay, such as encryption that is subsequently decrypted, that is not explicitly shown.

Referring now to FIG. 7, this figure depicts an embodiment that provides authorized Proxies (or, more specifically under Proxy partitioning, unterProxies) 710 with the [dataType, raw attribute interval, Blockchain Token] tuples that they require in order to convert raw attribute values or raw attribute intervals received from Users (via their Clients) to Attribute Values that take the form of User-specific Tokens. The KYC Processor 705 sends the dataType-specific permutation for each dataType requested at 730 from the KYC Database 720. The Coordinator 715 in turn sends the set of Blockchain Tokens in previously designated order for each dataType requested at 735 from the Attributes Registry Database 725. Alternative embodiments of this functionality may be differently configured in terms of distribution paths while achieving the same net result of authorized Proxies (or unterProxies) receiving those Blockchain Tokens and properly aligned associated metadata to which they are entitled.

In order to deny the Coordinator access to information which it has no legitimate need to acquire, a combination of one or more measures may be taken. As a non-exhaustive list of such measures: As depicted above using FIG. 6 and FIG. 7, the KYC Processor scrambles the order in which it requests generation of the full set of Blockchain Tokens (where that scrambling is made available to Proxies); the KYC Processor adds a fixed prefix to each raw attribute interval when requesting tokenization; the dataTypes of the selected PII fields and those used to generate Blockchain Tokens are configured to not overlap; one or more tokenization processors that are not under control of an authority that manages the Coordinator use different tokenization secrets for the generation of Blockchain Tokens than they do for generation of tokens to be used for other purposes (where such tokenization processors may be able to distinguish requests from KYC Processors from those made by participants of other types (potentially in addition to parsing tokenization requests to determine what type of token is being requested)).

Referring now to FIG. 8, a User 815 communicates via a Client 810 privately with a Proxy 825 in order to perform a Query against Attestations as shown in FIG. 4 pathway 424. In FIG. 8, Client 810, User 815, and Web Interface 820 are as introduced as 105, 110 and 115, respectively, in FIG. 1. A User 815 accesses their wallet of interest via a Client 810 at 835 in order to generate WalletSig (via application of the wallet private key), which when hashed and combined with WalletAddress produces hash(hash(WalletSig)∥WalletAddress). The resultant hash value, along with the dataTypes in the selected List(dataType), serves as a pointer to the Attestations on the blockchain which the MSB Smart Contract is instructed to query against (where the Client accesses the relevant Nonces at 840). UserQuerySig is generated over, in particular, List(dataType), List(NonceSigKD) and hash(WalletSig), as included in Table 1. For audit purposes, an additional argument of UserQuerySig may be hash(raw attribute value(s)||randValue), where randValue is a randomly/pseudorandomly generated value produced by the Proxy 825 and/or the Client 810. If such a hash value is included as an argument of UserQuerySig, then the hash value is provided by the Proxy 825 to the MSB Smart Contract 830 at 850, so that UserQuerySig can be verified. Alternatively, a fully off-line audit trail, such as involving an additional signature generated by the User's wallet can provide non-repudiable evidence of specific information conveyed by the User to the Proxy. This signature is not the native transaction signature in the regular Query without a Proxy 825 as shown in FIG. 5, or either signature generated by the User's wallet in the Proxy version shown in FIG. 9.

For clarity in explanation, the description here shows only those attributes which warrant utilization of Blockchain Tokens by the Proxy 825, as the User 815 may be aware of based on dataType. Although not shown here, even where the Proxy 825 handles dataTypes that do not warrant utilization of Blockchain Tokens, neither the Client 810 nor the Proxy 825 need provide those Attribute Values, as those are submitted directly by the MSB Smart Contract to the KYC Smart Contract 805 or are exhausted over by the KYC Smart Contract 805. As shown in FIG. 5, however, the User via the Client does need to provide dataType and NonceSigKD for those dataTypes. As an example of raw attribute values, this may be the User's stated zip code or the User's claim of credit score value(s) as retrieved from, e.g., averaged over, one or more sources and provided as an assertion by the User.

At 840, the User 815 via a Client 810 provides the Proxy 825 with the following: WalletPubKey, List(dataType), List(NonceSigKD), wallet outputs, and raw attribute value or raw attribute interval for those attributes that (based on dataType) are to be handled in tokenized form. Wallet outputs here refers to UserQuerySig and WalletSig. The Proxy 825 then performs their own processing at 855, shown in detail in FIG. 10 starting at 1025 and returning at 1070. The Proxy 825 sends a signed blockchain-conformant transaction for execution by the MSB contract code at 860, where such code has been developed so as to treat the Proxy's signature verification public key as an authenticated and publicly available key. This signature is over the following items that are contained in the transaction: wallet output derivative, List(dataType), List(NonceSigKD), UserQuerySig, WalletPubKey and List(Attribute Value), where Attribute Value=$f_1(f_2(KYCid||Nonce), Blockchain Token)$ or $f_1(f_2(KYCid||NonceSig*), Blockchain Token)$. Wallet output derivative here refers to hash(WalletSig). The combination of the above with the signature may be referred to as UserSignedMessage as in Table 1.

In the case of blockchain Queries to the MSB Smart Contract, the authenticated and publicly available Proxy 825 public key is used by the MSB Smart Contract 830 to verify the native blockchain signature tied to the sender (where the embedded User public key, WalletPubKey, is extracted from UserSignedMessage and used to verify the end-User's signature, i.e., UserQuerySig). A Query at 865 to the KYC Smart Contract 805 by the MSB Smart Contract 830 has no associated signature (native or otherwise) since this is simply a smart contract-to-smart contract invocation.

The KYC Smart Contract 805 attempts a retrieval of the KYCid and a dataType provided via a previously posted Attestation (for each dataType in List(dataType)). If MSB Smart Contract 830 had included as an argument of 865 particular Attribute Values, then the KYC Smart Contract 805 forms the Attestation using the given Attribute Value(s) and checks for a match given this value at 870. If an Attribute Value is not supplied for the given dataType, KYC Smart Contract 805 performs an exhaustive search over possible Attribute Values of the dataType at 875 (where not all such values need to be utilized if a match has already been found). This exhaustion by the KYC Smart Contract code execution is applicable only to dataTypes for which Attestations were originally constructed by the Coordinator using raw attribute values as Attribute Values (and where the MSB Smart Contract does not supply the Attribute Values directly to the KYC Smart Contract). If the KYC Smart Contract 805 is able to find a match on the dataType, it returns Yes or No, respectively, dependent on affirmative match or not, in response to an Attribute Value submitted at 870, or, per 875, it returns the matched value found via attempted exhaustion or No, respectively, dependent on affirmative match or not. If there was a match on the KYCid, but not on a dataType, the KYC Smart Contract 805 returns a dataType_Not_Found error. If there was no match on the KYCid at all, the KYC Smart Contract 805 returns a KYCid_Not_Found error at 880. The exhaustion process per 875 is not applicable to Attribute Values that are in the form of User-specific Tokens, in that if the KYC Smart Contract were supplied with Blockchain Tokens (even without their pairings with intervals) usable to construct User-specific Tokens, it would defeat the purpose of carefully limiting access to Blockchain Tokens. Knowledge of Blockchain Tokens (even without their associated intervals) enables correlation of Attribute Values across Users in the case that the information required to complete the computation of Attribute Values stemming from Blockchain Tokens is publicly available via the blockchain. In particular, in such case one would be able to observe whether two Attribute Values stemmed from the same Blockchain Token.

Figure 9:
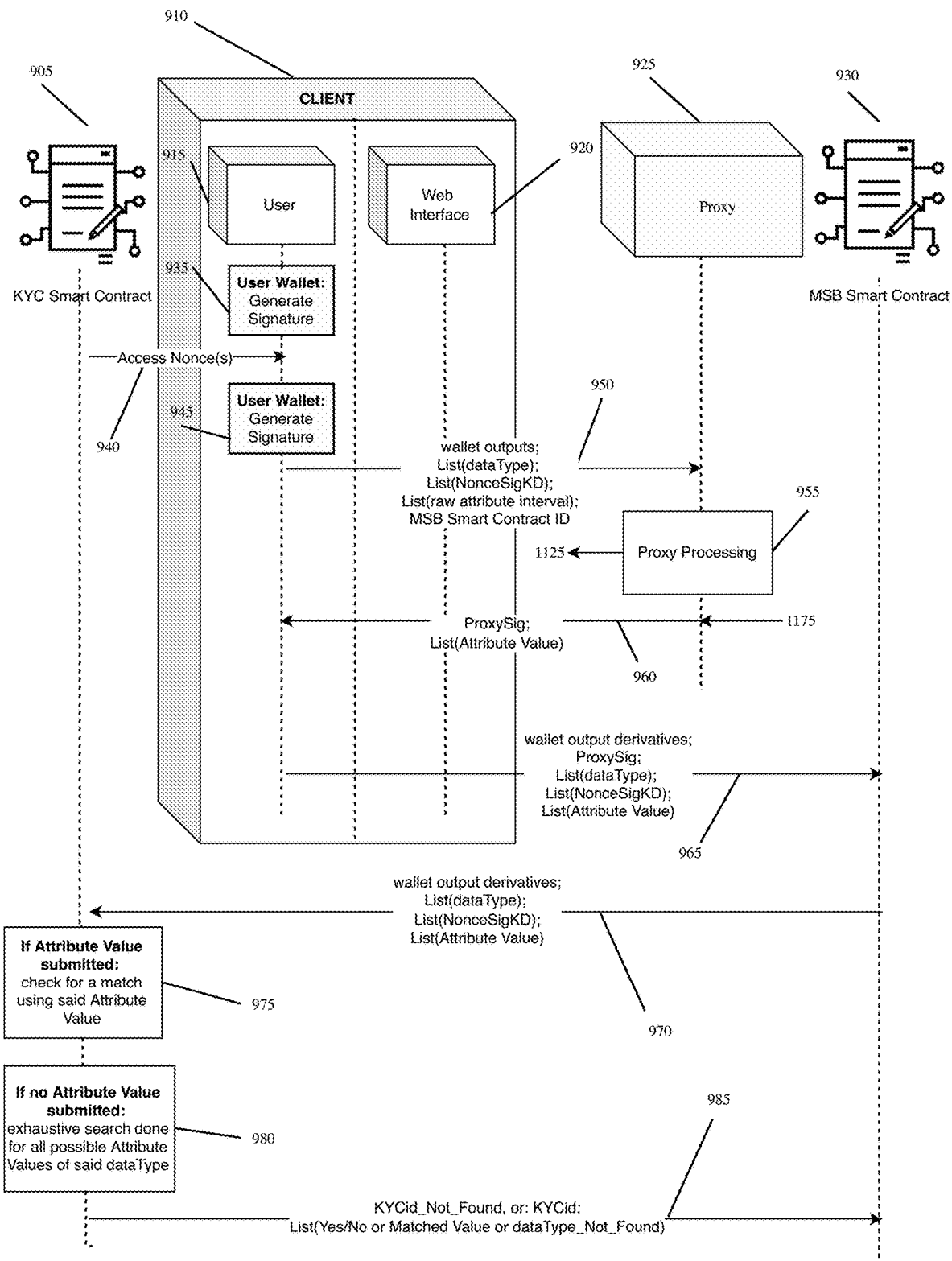
FIG. 9 comprises a flow diagram as configured in accordance with various embodiments of these teachings and that illustrates a method of performing a Query for the purpose of further-blinded data corroboration, including communication with a Client, Proxy, KYC Smart Contract and MSB Smart Contract. The transmissions depicted in FIG. 9 may include an overlay, such as encryption that is subsequently decrypted, that is not explicitly shown.

Referring now to FIG. 9, a User 915 communicates privately via a Client 910 with a Proxy 925 in order to perform a Query against Attestations as shown in FIG. 4 pathway 427. In FIG. 9, Client 910, User 915, and Web Interface 920 are as introduced as 105, 110 and 115, respectively, in FIG. 1. A User 915 accesses their wallet of interest via a Client 910 at 935 in order to generate WalletSig (via application of the wallet private key), which when hashed and combined with WalletAddress produces hash(hash(WalletSig)||WalletAddress). The resultant hash value, along with the dataTypes in the selected List(dataType), serves as a pointer to the Attestations on the blockchain from which the MSB Smart Contract is instructed to query against (where the Client accesses the relevant Nonces at 940). UserAuditSig is generated at 945 by the User's wallet by signing over, in particular, List(dataType), List(NonceSigKD) and hash(WalletSig), where these terms are as included in Table 1. For audit purposes, an additional argument of UserAuditSig may be hash(raw attribute value(s)||randValue), where randValue is a randomly/pseudorandomly generated value produced by the Proxy 925 and/or the Client 910. Alternatively, a fully off-line audit trail, such as involving an additional signature generated by the User's wallet, can provide non-repudiable evidence of specific information conveyed by the Client 910 to the Proxy 925. The signature here is not the native transaction signature in the regular Query without a Proxy 925 as shown in FIG. 5, or the signature generated by the User's wallet in the Proxy version shown in FIG. 8. It is a signature used only for audit purposes at the Proxy.

For clarity in explanation, the description here shows only those attributes which warrant utilization of Blockchain Tokens by the Proxy 925, as the User 915 may be aware of based on dataType. Note that (not shown here) even where the Proxy 925 handles dataTypes that do not warrant utilization of Blockchain Tokens, neither the Client 910 nor the Proxy 925 need provide those Attribute Values, as those are submitted directly by the MSB Smart Contract to the KYC Smart Contract 905 or are exhausted over by the KYC Smart Contract 905. As shown in FIG. 5, however, the User does need to provide dataType and NonceSigKD for those dataTypes. As an example of raw attribute values, this may be the User's stated zip code or the User's claim of credit score value(s) as retrieved from one or more sources and provided as an assertion by the User.

At 950, the User 915 via a Client 910 provides the Proxy 925 with: WalletPubKey, List(dataType), List(NonceSigKD), wallet outputs, MSB Smart Contract ID and raw attribute value or raw attribute interval for those attributes that (based on dataType) are to be handled in tokenized form. Wallet outputs here refers to UserAuditSig and WalletSig. The Proxy 925 now performs their own processing at 955 shown in detail in FIG. 11 starting at 1125 and returning at 1175. The Proxy 925 sends ProxySig (as generated in FIG. 11 at 1170 and defined in Table 1) and List(Attribute Value) back to the User 915 at 960. ProxySig may be computed over alternative and/or additional arguments than those included in the definition of ProxySig in Table 1. For example, one such additional argument may be current blockchain height or current blockchain hash (as a means of positioning ProxySig in terms of blockchain activity).

The User 915 sends a signed blockchain-conformant (or, more generally, a signed platform-conformant) transaction for execution by the MSB Smart Contract code at 965. This signature is over wallet output derivative, List(dataType), List(NonceSigKD), ProxySig, MSB Smart Contract ID and List(Attribute Value), where Attribute Value=$f_1(f_2(KYCid\|Nonce)$, Blockchain Token). Wallet output derivative here refers to hash(WalletSig). A Query at 970 to the KYC Smart Contract 905 by the MSB Smart Contract 930 has no associated signature (native or otherwise), since this is simply a smart contract-to-smart contract invocation.

The KYC Smart Contract 905 attempts a retrieval of the KYCid and a dataType provided via a previously posted Attestation (for each dataType in List(dataType)). If MSB Smart Contract 930 had included as an argument of 970 particular Attribute Values, then the KYC Smart Contract 905 forms the Attestation using the given Attribute Value(s) and checks for a match given this value at 975. If an Attribute Value is not supplied for the given dataType, KYC Smart Contract 905 performs an exhaustive search over possible Attribute Values of the dataType at 980 (where not all such values need to be utilized if a match has already been found). This exhaustion by the KYC Smart Contract code execution is applicable only to dataTypes for which Attestations were originally constructed by the Coordinator using raw attribute intervals as Attribute Values (and where the MSB Smart Contract does not supply the Attribute Values directly to the KYC Smart Contract). If the KYC Smart Contract 905 is able to find a match on the dataType, it returns Yes or No, respectively, dependent on affirmative match or not, in response to an Attribute Value submitted at 975, or, per 980, it returns the matched value found via attempted exhaustion or No, respectively, dependent on affirmative match or not. If there was a match on the KYCid, but not on a dataType, the KYC Smart Contract 905 returns a dataType_Not_Found error. If there was no match on the KYCid at all, the KYC Smart Contract 905 returns a KYCid_Not_Found error at 985. The exhaustion process per 980 is not applicable to Attribute Values that are in the form of User-specific Tokens in that if the KYC Smart Contract were supplied with Blockchain Tokens (even without their pairings with intervals) usable to construct User-specific Tokens, it would defeat the purpose of carefully limiting access to Blockchain Tokens. Knowledge of Blockchain Tokens (even without their associated intervals) enables correlation of Attribute Values across Users in the case that the information required to complete the computation of Attribute Values stemming from Blockchain Tokens is publicly available via the blockchain. In particular, in such case one would be able to observe whether two Attribute Values stemmed from the same Blockchain Token.

Figure 10:
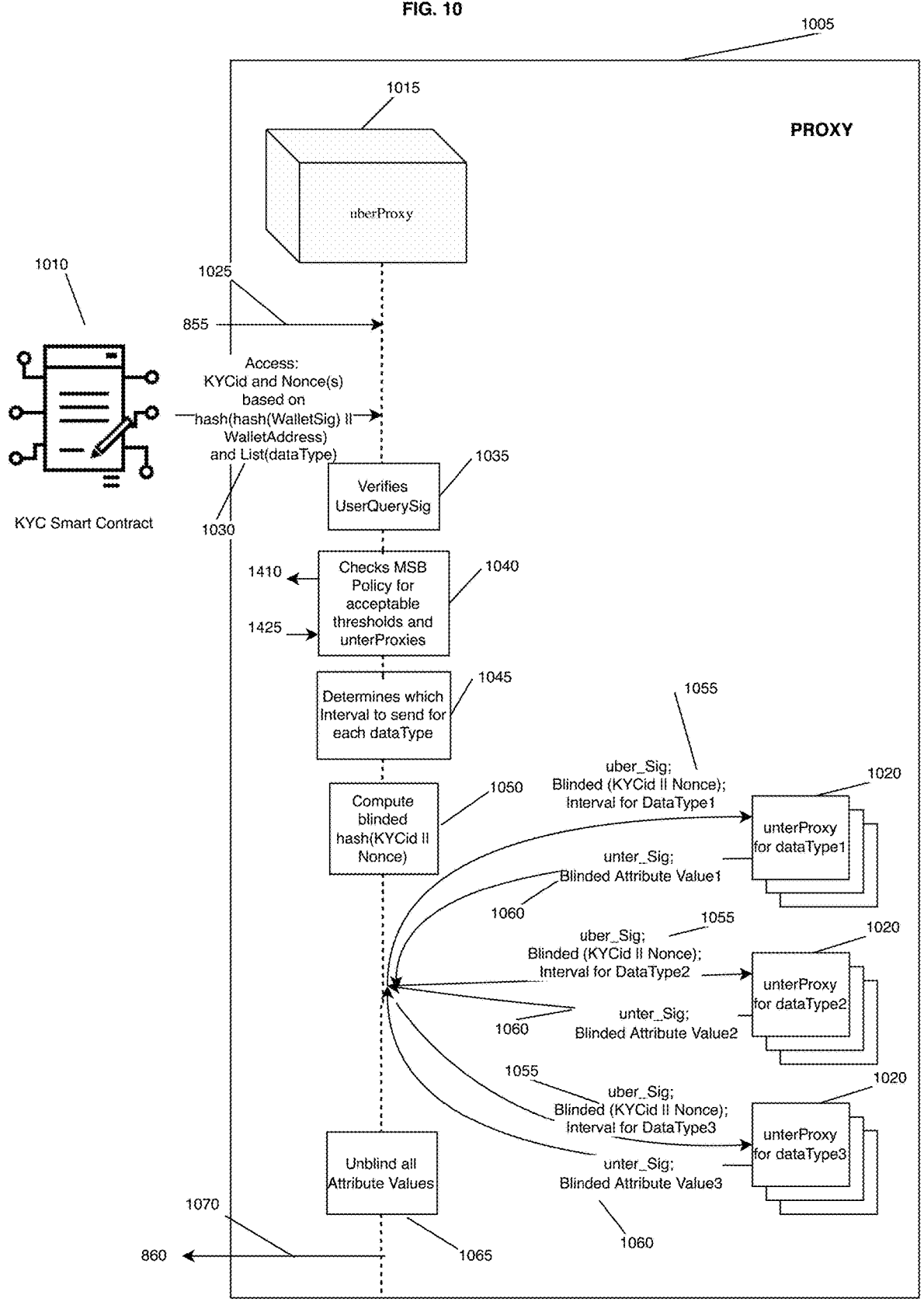
FIG. 10 comprises a flow diagram as configured in accordance with various embodiments of these teachings and that illustrates an embodiment of the Proxy processing utilized in FIG. 8 to form the Attribute Values, including communication between the unterProxies and uberProxy. The transmissions depicted in FIG. 10 may include an overlay, such as encryption that is subsequently decrypted, that is not explicitly shown.
Figure 14:
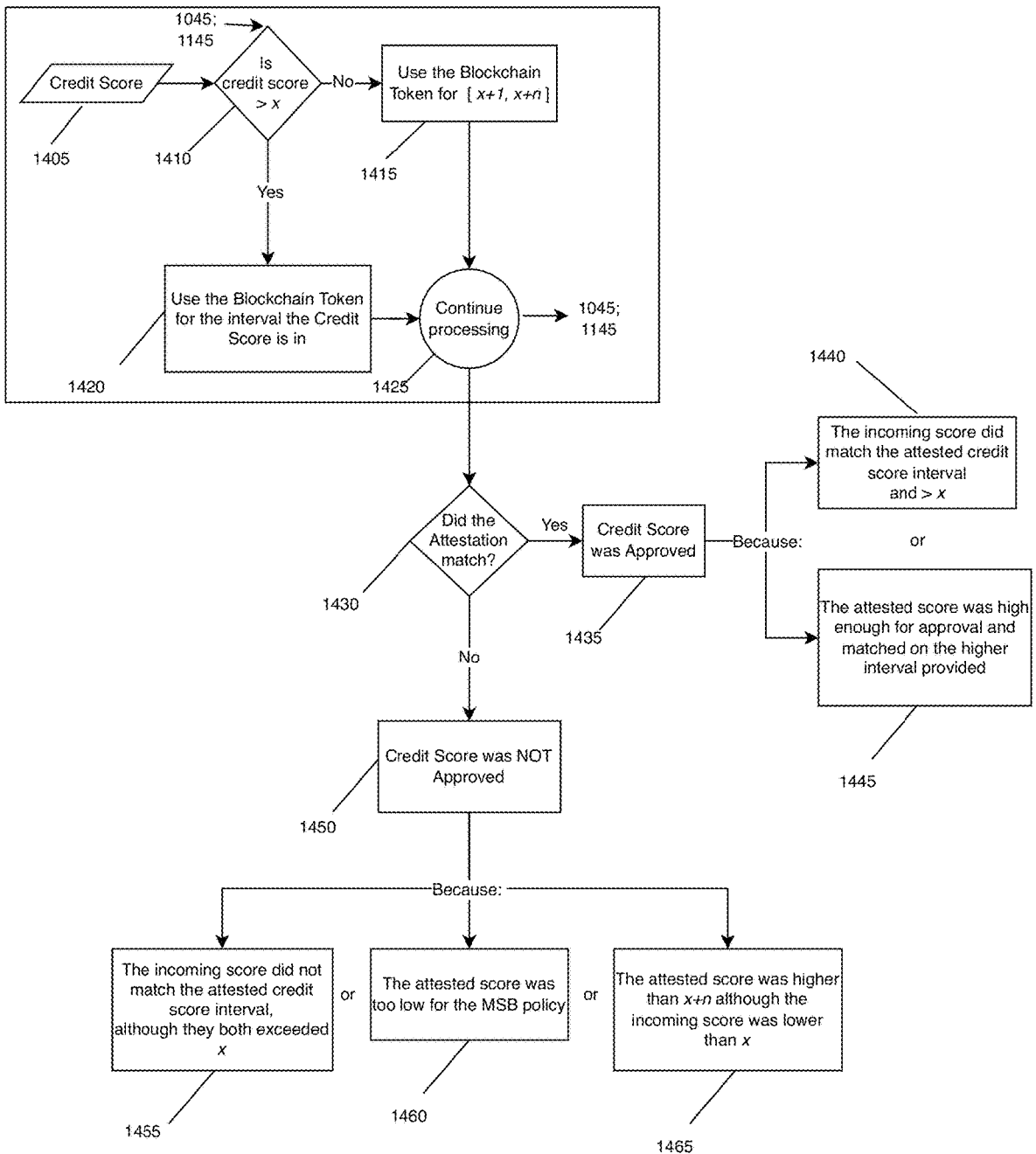
FIG. 14 comprises a flow diagram as configured in accordance with various embodiments of these teachings and that illustrates the decision process and reasoning behind the choice of Blockchain Token by a Proxy during a Query.

Referring now to FIG. 10, the uberProxy 1015 and unterProxies 1020 make up the Proxy 1005, also referred to as 825 in FIG. 8. The uberProxy 1015 begins processing at 850 in FIG. 8 or 1020 in FIG. 10. The uberProxy 1015 computes WalletAddress from WalletPubKey and retrieves KYCid and Nonces for dataTypes of List(dataType) at 1030 from KYC Smart Contract 1010 based on local computation of hash(hash(WalletSig)||WalletAddress), where WalletSig received in 1020 is used to generate hash(WalletSig). The uberProxy 1015 verifies UserQuerySig by applying WalletPubKey at 1035. The uberProxy 1015 first checks the MSB policy (which may be an MSB-specific policy) for the acceptable thresholds for the dataType(s) sent in 1025 as well as any preferences for any of the unterProxies 1020 that would be listed in this MSB policy at 1040. In order to determine the interval(s) that should be sent to the one of the unterProxies 1020 to be formed into Blockchain Token(s) and ultimately the Attribute Value(s), the uberProxy 1015 performs the decision process at 1045 as depicted in FIG. 14. The blinded version of hash(KYCid||Nonce) is now computed by converting hash(KYCid||Nonce) into an elliptic curve point representation P and applying a random scalar value, e, at 1050 to form eP. The uberProxy 1015 then signs and transmits eP, the interval(s) to become Blockchain Tokens, and the signature, denoted as uber_Sig, to the necessary unterProxy of the several unterProxies 1020 depending on the dataType at 1055.

The chosen unterProxy of the several unterProxies 1020 utilizes its previously provisioned accessible database of [raw attribute interval, Blockchain Token] tuples for retrieval of the appropriate Blockchain Token(s). The chosen unterProxy of the several unterProxies 1020 determines which stored Blockchain Token(s) to use, applies a scalar representation, p, of the Blockchain Token(s) to the provided eP to form peP, and provides the signed blinded Attribute Value to the uberProxy 1015 at 1060, where the blinded Attribute Value=peP, and the signature (denoted as unter_Sig).

The uberProxy 1015 unblinds the Attribute Value at 1065 by applying the inverse of the previously applied blinding factor, p, to form Attribute Value=pP. As mentioned previously, these uberProxies and unterProxies may be expandable as described, they may be collapsed into a single processor or any combination of the above. In the case that they are collapsed, all of the actions done by an element of the Proxy can be done by the single Proxy processor to accomplish the same goal. Now that the Proxy 1005 has finished the necessary processing, it proceeds with the protocol outlined in FIG. 8 at 850 at 1070.

Figure 11:
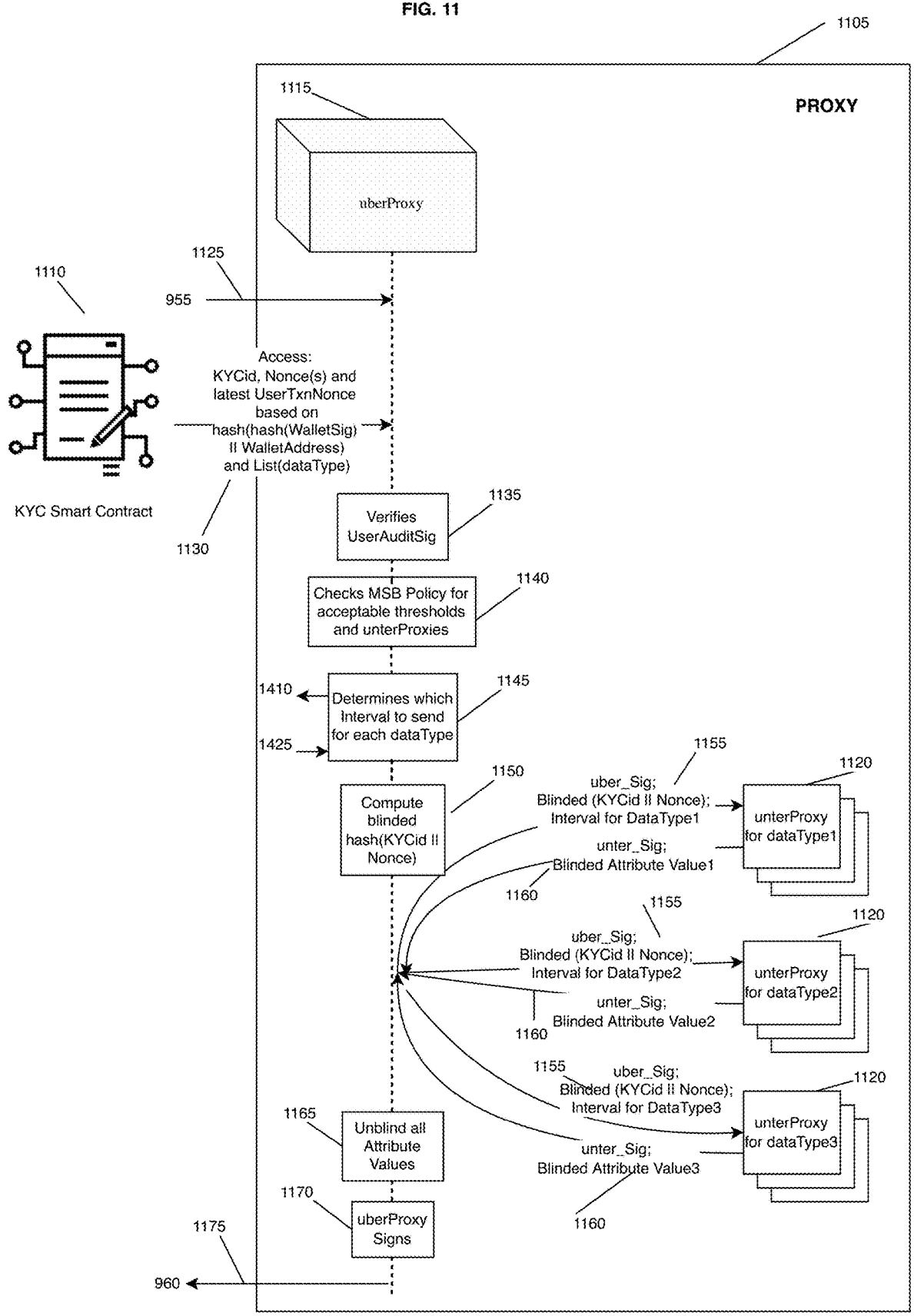
FIG. 11 comprises a flow diagram as configured in accordance with various embodiments of these teachings and that illustrates an embodiment of the Proxy processing utilized in FIG. 9 to form the Attribute Values, including communication between the unterProxies and uberProxy. The transmissions depicted in FIG. 11 may include an overlay, such as encryption that is subsequently decrypted, that is not explicitly shown.

Referring now to FIG. 11, the uberProxy 1115 and unterProxies 1120 make up the Proxy 1105, also referred to as 925 in FIG. 9. The uberProxy 1115 begins processing at 955 in FIG. 9 or 1125 in FIG. 11. The uberProxy 1115 computes WalletAddress from WalletPubKey and retrieves KYCid, Nonces, and the latest UserTxnNonce for dataTypes of List(dataType) at 1130 from KYC Smart Contract 1110 based on local computation of hash(hash(WalletSig)||WalletAddress), where WalletSig received in 1125 is used to generate hash(WalletSig). The UserTxnNonce, as included in Table 1, is a native blockchain nonce/native platform nonce used within the blockchain (or other platform) infrastructure that is incremented with each successive native blockchain signature/native platform signature generated by the User Wallet. Therefore, having the uberProxy 1115 retrieve the latest value of UserTxnNonce from the KYC Smart Contract 1170 and incorporate a derived value, say, UserTxnNonce+1, as an argument of its signature generated at 1170 will enable the MSB Smart Contract 930 to check the freshness of the signature of the Proxy 925 (also known as Proxy 1105 or uberProxy 1115) as measured against the natively signed transaction received at 965. In a cryptographic context, checking freshness can guard against unwitting acceptance of a received transmission that should have been rejected, e.g., because the received transmission contains data that has been replayed and/or delayed (where delay may be measured, e.g., as elapsed time and/or degree of intervening transaction activity). The uberProxy 1115 verifies UserAuditSig by applying WalletPubKey at 1135. The uberProxy 1115 first checks the MSB policy for the acceptable thresholds for the dataType(s) at 1140 sent in 1125 as well as any preferences for any of the unterProxies 1120 that would be listed in this MSB policy. In order to determine the interval(s) that should be sent to one of the unterProxies 1120 to be formed into Blockchain Token(s) and ultimately the Attribute Value(s), the uberProxy 1115 performs the decision process at 1145 and as depicted in FIG. 14, i.e., in deciding which interval, as a raw attribute interval, it assigns. The blinded version of hash(KYCid-||Nonce) or hash(KYCid||NonceSig*) is now computed by converting hash(KYCid||Nonce) or hash(KYCid||NonceSig*) into an elliptic curve point representation P and applying a random scalar value, e, at 1150 to form eP. The uberProxy 1115 now signs and transmits eP, the interval(s) to become Blockchain Tokens, and the signature denoted as uber_Sig to the necessary unterProxy of the several unterProxies 1120 depending on the dataType at 1155.

The chosen unterProxy of the several unterProxies 1120 utilizes its previously provisioned accessible database of [raw attribute interval, Blockchain Token] tuples for retrieval of the appropriate Blockchain Token(s). The chosen unterProxy of the several unterProxies 1120 determines which stored Blockchain Token(s) to use, applies a scalar representation, p, of the Blockchain Token(s) to the provided eP to form peP, and provides the signed blinded Attribute Value to the uberProxy 1115 at 1160, where the blinded Attribute Value=peP, and the signature (denoted as unter_Sig). The uberProxy 1115 unblinds the Attribute Value at 1165 by applying the inverse of the previously applied blinding factor, e to form Attribute Value=pP. The uberProxy now signs the MSB Smart Contract ID, hash(WalletSig), UserTxnNonce+1, List(dataType), List(NonceSigKD), and List(Attribute Value) at 1170 to produce ProxySig as defined in Table 1. Now that the Proxy 1105 has finished the necessary processing, it proceeds with the protocol outlined in FIG. 9 at 960.

With reference in particular to FIG. 10 and FIG. 11, by one approach, the Proxy is split into component hierarchical sub-Proxies wherein at least one sub-Proxy is at least transiently blinded by another sub-Proxy from access to User-specific information.

With further reference in particular to FIG. 10 and FIG. 11, by one approach, a first sub-Proxy assigns the raw attribute interval and selects the User-specific information, and a second sub-Proxy combines a Platform Token that represents an interval of values of the attribute with the User-specific information.

With further reference in particular to FIG. 10 and FIG. 11, by one approach, the first sub-Proxy applies a transient blinding factor to the User-specific information before making it available to the second sub-Proxy for use in a computation by the second sub-Proxy and removes the transient blinding factor from the computation by the second sub-Proxy.

With further reference in particular to FIG. 10 and FIG. 11, by one approach, the transient blinding factor is applied as a scalar multiplier of an elliptic curve point.

Figure 12:
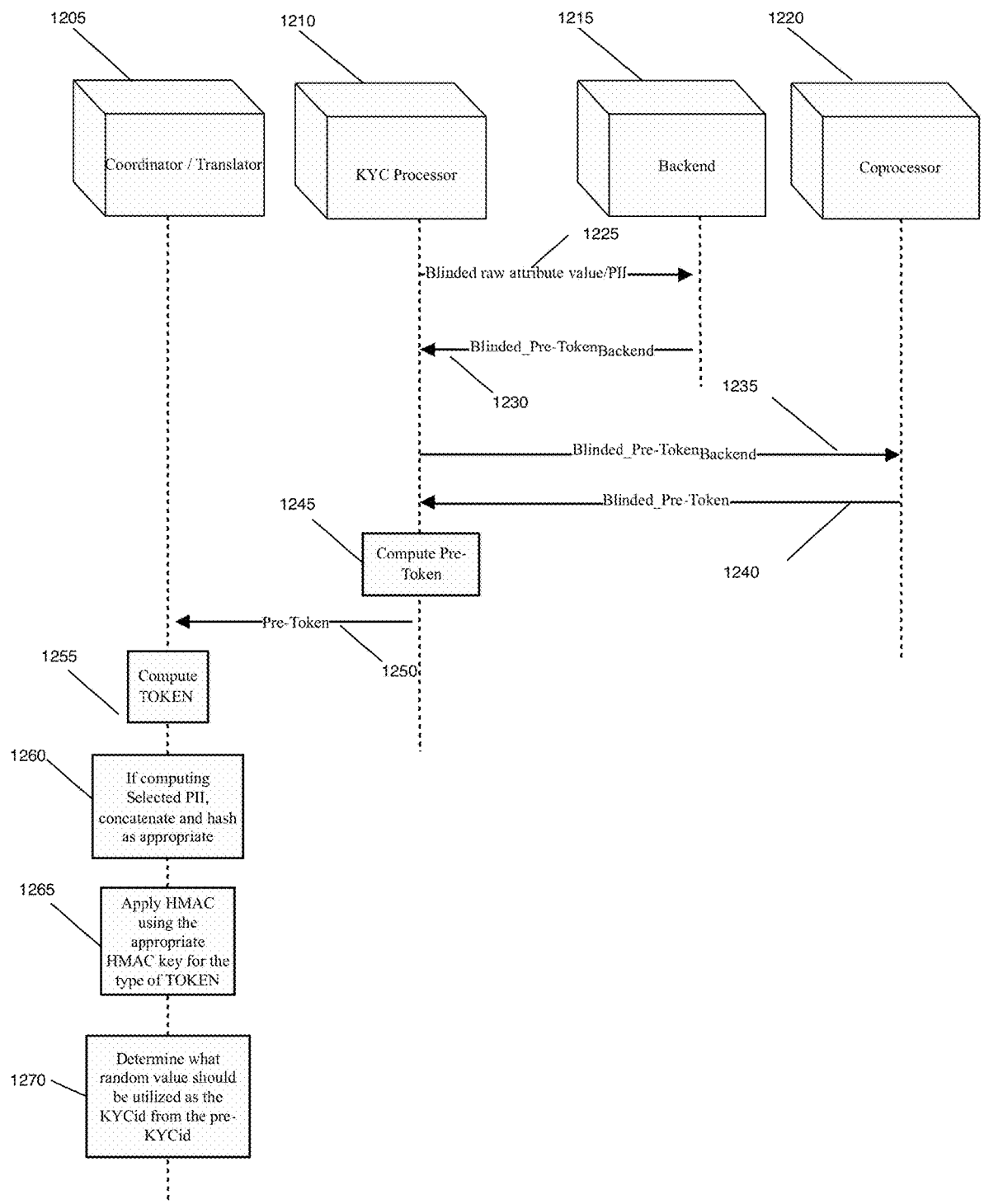
FIG. 12 comprises a flow diagram as configured in accordance with various embodiments of these teachings and that illustrates the processing of Blockchain Tokens and KYCids through the use of a Backend, Coprocessor and Coordinator/Translator, where the Backend and Coprocessor act sequentially. The transmissions depicted in FIG. 12 may include an overlay, such as encryption that is subsequently decrypted, that is not explicitly shown.

Referring now to FIG. 12, the KYC Processor 1210 sends to the Backend 1215 Blinded_INFO=eP at 1225 where P is the elliptic curve point representation of either the raw attribute interval in the case of Blockchain Token computation or Selected PII in the case of pre-KYCid computation. e is a randomly generated scalar. The KYC Processor 1210 receives from the Backend 1215 at 1230 Blinded_Pre-Token$_{Backend}$=bbeP where bb is the Backend's private elliptic curve scalar. The KYC Processor 1210 sends to the Coprocessor 1220 Blinded_Pre-Token$_{Backend}$ at 1235. The KYC Processor 1210 receives from the Coprocessor 1220 at 1240 Blinded_Pre-Token=ccbbeP where cc is the Coprocessor's private elliptic curve scalar. The KYC Processor 1210 computes $e^{-1}$(Blinded_Pre-Token)=$e^{-1}$(ccbbeP)=ccbbP=Pre-Token at 1245. The KYC Processor 1210 sends to the Coordinator/Translator 1205 Pre-Token=ccbbP at 1250. The Coordinator/Translator 1205 computes TOKEN=hash(tt(Pre-Token))=hash(ttccbbP) at 1255. If this is going to result in a KYCid, the Coordinator/Translator 1205 computes hash(Selected PII TOKENS) at 1260. If this is going to result in a Blockchain Token, the TOKEN is referred to as the raw attribute interval Token. The Coordinator/Translator 1205 then applies HMAC using the BLOCKCHAIN_HMAC_KEY or KYC_HMAC_KEY depending on if it will become a Blockchain Token or pre-KYCid, respectively, at 1265. In one embodiment, for final KYCid processing, the Coordinator/Translator 1205 attempts to look up the pre-KYCid in the database accessible to the Coordinator/Translator 1205 at 1270. If an entry is found, the associated random value is the KYCid. If no entry is found, then a new randomly generated value is entered in the database as associated with the pre-KYCid and used as the KYCid.

Figure 13:
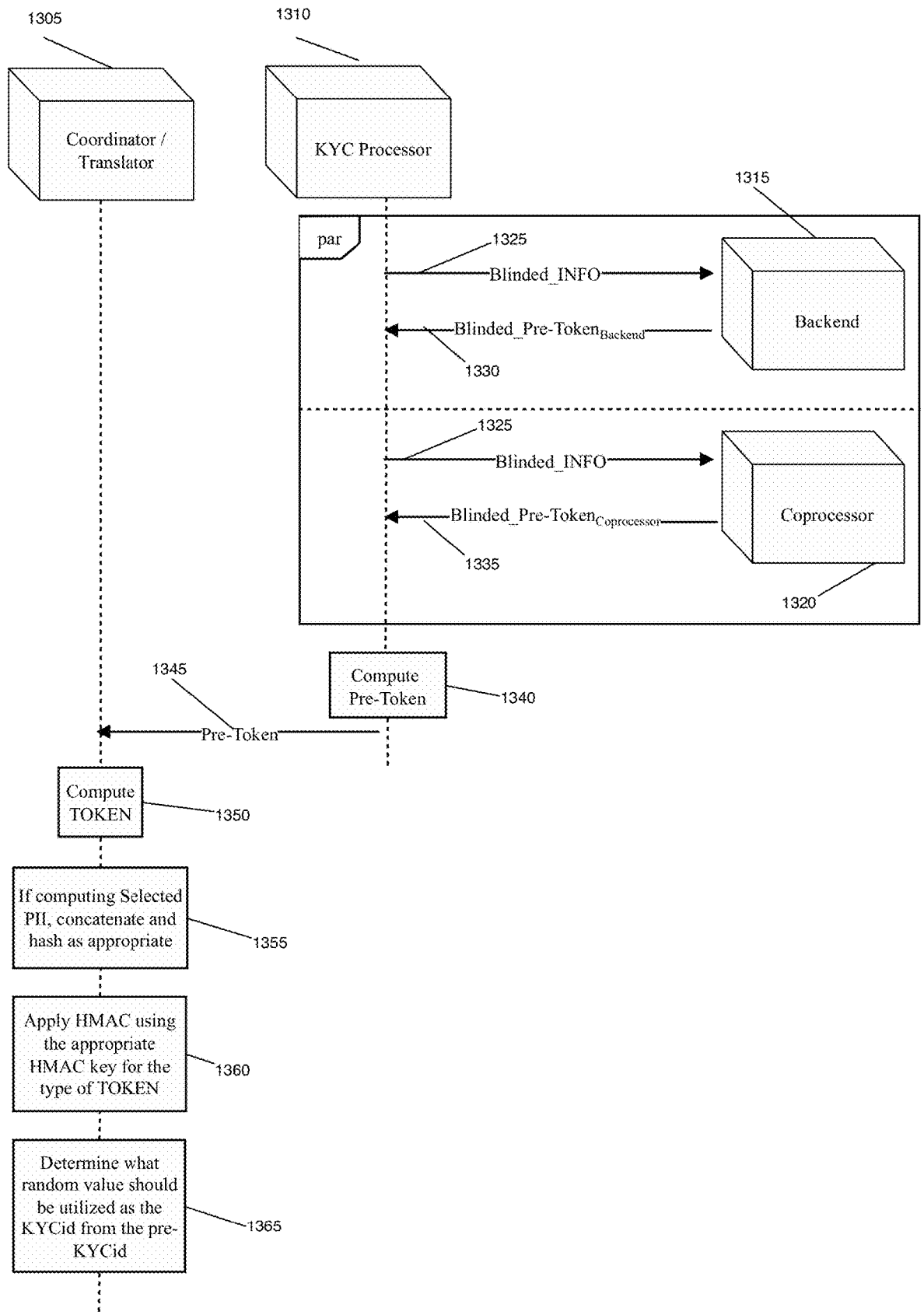
FIG. 13 comprises a flow diagram as configured in accordance with various embodiments of these teachings and that illustrates the processing of Blockchain Tokens and KYCids through the use of a Backend, Coprocessor and Coordinator/Translator, where the Backend and Coprocessor act in parallel. The transmissions depicted in FIG. 13 may include an overlay, such as encryption that is subsequently decrypted, that is not explicitly shown.

Referring now to FIG. 13, the KYC Processor 1310 sends to the Backend 1315 and the Coprocessor 1320 Blinded_INFO=eP at 1325 where P is the elliptic curve point representation of either the raw attribute interval in the case of Blockchain Token computation or Selected PII in the case of pre-KYCid computation. e is a randomly generated scalar. The KYC Processor 1310 receives from the Backend 1315 at 1330 Blinded_Pre-Token$_{Backend}$=bbeP where bb is the Backend's private elliptic curve scalar. The KYC Processor 1310 receives from the Coprocessor 1320 at 1335 Blinded_Pre-Token$_{Coprocessor}$=cceP where cc is the Coprocessor's private elliptic curve scalar. The KYC Processor 1310 computes: $e^{-1}$(Blinded_Pre-Token$_{Backend}$+Blinded_Pre-Token$_{Coprocessor}$), which equals $e^{-1}$(bbeP+cceP)=(bb+cc)P=Pre-Token, at 1340. The KYC Processor 1310 sends to the Coordinator/Translator 1305 Pre-Token at 1345. The Coordinator/Translator 1305 computes TOKEN=hash(tt (Pre-Token))=hash(tt(bb+cc)P) at 1350. If this is going to result in a KYCid, the Coordinator/Translator 1305 computes hash(Selected PII TOKENS) at 1355. If this is going to result in a Blockchain Token, the TOKEN is referred to as the raw attribute interval Token. The Coordinator/Translator 1305 then applies HMAC using the BLOCKCHAIN_HMAC_KEY or KYC_HMAC_KEY depending on if it will become a Blockchain Token or KYCid, respectively, at 1360, resulting in a Blockchain Token or a pre-KYCid, respectively. In one embodiment, for final KYCid processing, the Coordinator/Translator 1305 attempts to look up the pre-KYCid in the database accessible to the Coordinator/Translator 1305 at 1365. If an entry is found, the associated random value is the KYCid. If no entry is found, then a new randomly generated value is entered in the database as associated with the pre-KYCid and used as the KYCid.

With reference in particular to FIG. 12 and FIG. 13, by one approach, the data is blinded from access by at least one of: (1) the Coordinator, as coordinating network element; (2) the at least one network element that serves as an intermediary between the at least one requesting network element and the Coordinator.

Referring now to FIG. 14, in FIG. 10 and FIG. 11, the uberProxy (or if it is consolidated, the Proxy) must decide which interval to turn into a Blockchain Token and therefore use in the process of creating the Attribute Value. For clarity in explanation, the description here shows only the decision process for the dataType of credit score, however, the process will be similar for other dataTypes such as income, zip code, or other interval-related dataTypes. In the description here, x represents the MSB-specific policy threshold for acceptable credit scores, and the intervals submitted occur every n possible scores. Upon the input of the Credit Score 1405 (which could also be input as an interval) the Proxy determines if the Credit Score is greater than the necessary threshold x as determined by the MSB-specific policy at 1410. If the Credit Score did not exceed x as at 1415, then the first interval that would exceed the x should be used [x+1, x+n]. If the Credit Score is higher than x as at 1420, then Blockchain Token for the interval the Credit Score is in (or the given interval) should be used. In both cases, the Query continues processing at 1425. Upon the checking of a match at 1430, there may be many reasons why the Attestation did not match, but this description focuses on the reasons by the Blockchain Token itself would cause the Attestation to match or not and therefore why the Credit Score would be approved or not. If the Credit Score was approved as at 1435, then it may be for one of two reasons: (1440) the incoming score interval matched the attested credit score interval and exceeded the threshold of x (i.e., was on the pathway 1420); or (1445) the attested credit score interval exceeded the threshold of x and this interval matched that of the interval chosen at 1415. If the Credit Score was not approved as at 1450, then it may be for one of three reasons: (1455) the incoming Credit Score interval did not match the attested Credit Score interval, although they both exceeded the threshold of x; or (1460) the attested Credit Score interval was too low for the MSB policy and therefore did not match the higher Credit Score interval chosen in 1415 or a falsely submitted higher Credit Score interval on pathway 1420; or (1465) the attested score was higher than x+n, although the incoming Credit Score interval was lower than x and the interval of [x+1, x+n] was submitted at 1415. To lower the possibility of false negatives in the cases 1455 and 1465, the Proxy could be set up to compute and send Attribute Values for multiple Blockchain Tokens that each correspond to an interval that meets the threshold set by MSB policy at 1415. It is acceptable for conveyance of false information by a User (due to User misrepresentation or to an uninformed User) having the effect of a false negative match, but preferably not a false positive match relative to computation of Attestations during Query as compared to their original counterparts attested to the KYC Smart Contract by the Coordinator.

With reference to FIG. 14 in particular, by one approach, a Proxy outputs a tokenized form of a raw attribute interval, wherein the raw attribute interval is assigned to the User based, at least in part, on an assertion provided by the User.

With further reference to FIG. 14 in particular, by one approach, the raw attribute interval is assigned in accordance with an application-specific policy.

Now referring to FIG. 15, it may be considered worth the additional off-chain/off-platform communications in order to split access to Blockchain Tokens and therefore render tokenized Attribute Values persistently opaque in the absence of collusion, in which case parallelized secure multiparty computation may be utilized. The uberProxy 1510 and unterProxy1 1515 for dataType1 and unterProxy2 1520 for dataType1 make up the Proxy 1505. One embodiment of this is as follows: if unterProxy1 1515 for dataType1 is provisioned with $p_1$=(HMAC(BLOCKCHAIN_HMAC_KEY, x)||HMAC(BLOCKCHAIN_HMAC_KEY, x+1)) mod n and unterProxy2 1520 for dataType1 is provisioned with $p_2$=(HMAC(BLOCKCHAIN_HMAC_KEY, x+2)||HMAC(BLOCKCHAIN_HMAC_KEY, x+3)) mod n where x is the final step by the Coordinator before applying the HMAC. The unterProxy1 1515 applies $p_1$ to the blinded hash(KYCid||Nonce)=eP (or blinded hash(KYCid||NonceSig*)) that was computed by the uberProxy 1510 in 1525 and sent in 1530. Similarly, unterProxy2 1520 applies $p_2$ to the blinded hash(KYCid||Nonce)=eP (or blinded hash(KYCid||NonceSig*)) that was computed in 1520 and sent in 1525. The unterProxy1 1515 sends back Blinded Pre-Attribute Value1=$p_1$eP at 1535 and the unterProxy2 1520 sends back Blinded Pre-Attribute Value2=$p_2$eP at 1540. The uberProxy then sums the elliptic curve points $p_1$eP and $p_2$eP at 1545, and removes the blinding factor and hashes to produce Attribute Value=hash(($p_1$+$p_2$)P) at 1550.

Referring now to FIG. 16, an alternative embodiment of the Attestation is shown in order to achieve cryptographic isolation of Query handling across changes in the User's monitored raw attribute value (for example, a monitored credit score), and/or in the system-set quantization and/or positioning of raw attribute intervals that may be dataType-specific but is preferably not MSB-specific (where the User's client software can deduce the User's current value of k, and what range of values (corresponding to raw attribute intervals, where the User's specific value of the attribute is contained within the kth such raw attribute interval) to selectively release based on current MSB-specific policy, e.g., a current qualifying credit score minimum threshold set by the particular MSB). The Attestation is intended to hide the value of interval label k as ranging between 1 and n, while selective release by the User is intended to restrict the range to a proper subrange of interval labels spanning from 1 to n. If the User is aware of the raw attribute values included within the raw attribute interval labeled as the User's current value of k, the User may thus learn information about their currently-assigned raw attribute value and/or detect an apparent discrepancy in that assignment relative to the User's knowledge about their current raw attribute value gleaned from one or more other sources. The following is intended to prove containment within a chosen sequence of raw attribute intervals including the actual raw attribute interval assigned to the User. For credit scores, proving a lower bound that is consistent with the requirement of a given MSB is most-likely sufficient (and a solution for other use cases may rely on proving only an upper bound), but for certain dataTypes (e.g., Zip Codes) this capability enables the ability to prove an upper bound. Suppose that the overall meaningful range for a given dataType is mapped to n raw attribute intervals labeled, without loss of generality, as 1 through n (where n may vary according to dataType). These ascending raw attribute intervals may not be the same length, but the range of each raw attribute interval is preferably made available to those who need that information. The raw attribute interval ranges are not necessarily contiguous and two or more raw attribute interval ranges may possibly overlap. Further, dependent on dataType, the values of the attribute (and thus the endpoints of each raw attribute interval) are not necessarily confined to integers.

In FIG. 16, Client 1605, User 1610, and Web Interface 1615 are as introduced as 105, 110 and 115, respectively, in FIG. 1. The Client's Web interface 1615 retrieves a Signed Nonce tuple=[Nonce; Nonce_validity_period; Sign(Nonce; Nonce_validity_period)] (as included in Table 1) at 1635 from the KYC Processor 1620, where the KYC Processor 1620 randomly/pseudorandomly generates Nonce values and digitally signs or uses another keyed function on each such Nonce and its associated validity period/expiration/timestamp. The KYC Processor 1620 has made such a Signed Nonce tuple available via the Client's Web interface 1615.

The User 1610 utilizes their wallet via a Client 1605 to generate the necessary deterministic digital signatures using their wallet private key at 1640: WalletSig; NonceSig. These signatures are herein referred to as wallet outputs. The User 1610 provides the following to the KYC Processor 1620 via a Client 1605 at 1645: personal information/identification; WalletPubKey; Signed Nonce tuple; wallet outputs.

The KYC Processor 1620 verifies validity of the Signed Nonce tuple, wallet outputs, personal information and information (such as the User's credit score) supplied by other sources during the Verification and Data Acquisition shown at 1650, and shown in more detail in FIG. 2. The KYC Processor 1620 may run into errors during verification in FIG. 2 at 215 or 235, in which case instead of returning at 240 of FIG. 2 to 1660 of FIG. 16, the KYC Processor 1620 would return an error to the Client 1605 at 1655 of FIG. 16. If no error occurs, the KYC Processor 1620 computes hash(WalletSig) and hash(NonceSig) referred to in FIG. 16 as wallet output derivatives transmitted at 1665 (along with WalletAddress or WalletPubKey which can be used to determine WalletAddress). Let the raw attribute value (e.g., a credit score or zip code) that is attested to be in raw attribute interval k of that dataType. This raw attribute value is also denoted as the User's specific value below. As indicated below, knowledge of hash(NonceSig) may not be required at the Attributes Registry/Coordinator 1625 (and thus may be excluded from wallet output derivatives transmitted at 1665), dependent on where Attestation_Up and Attestation_Down are computed.

In this embodiment (as compared to FIG. 1), attributes to be queried (perhaps dependent on dataType) are such that the attested to data may be attested to as raw attribute values or a hash-chain form. For ease of description, FIG. 16 will only discuss the hash-chain form since the raw form is addressed in FIG. 1. This also applies to FIG. 17, in that raw attribute values could be communicated in the place of the hash-chain forms. Given that the data must be presented in this alternative way, the KYC Processor 1620 must perform computations and send these to the Attributes Registry/Coordinator 1625, where the User's specific value of the attribute for the given dataType is currently within raw attribute interval k of that dataType. (Alternatively, if the KYC Processor 1620 forwards such k (as well as hash (NonceSig)), the Attributes Registry/Coordinator 1625 can perform such computations directly.) At block 1660, the KYC Processor 1620 computes Attestation_Up and Attestation_Down as follows and as defined in Table 1: Attestation_Up=hash$^k$(hash(0||dataType||UpdateIndex||hash (NonceSig))) and Attestation_Down=hash$^{n+1-k}$(hash (1||dataType||UpdateIndex||hash(NonceSig))). 0 and 1 should be construed here only as examples of possible prefixes used in computation of Attestation_Up and Attestation_Down, respectively. In an alternative embodiment, at block 1660 the KYC Processor 1620 computes Attestation_Up, but not Attestation_Down. In another alternative embodiment, at block 1660 the KYC Processor 1620 computes Attestation_Down, but not Attestation_Up.

The KYC Processor 1620 transmits to the Attributes Registry/Coordinator 1625: Attestation_Up and Attestation_Down (or in other embodiments, only Attestation_Up or only Attestation_Down, respectively); dataType; Nonce; wallet output derivatives at 1665. The KYC Processor 1620 requests tokenization of selected data (which may be personally identifiable information (PII) data) at 1670 for the KYCid that corresponds to the User 1610. Such data may be extracted directly from the User's presented form of identification and/or be derived from the vetting process during the Verification and Data Acquisition step at 1650. Preferably, such data is consistent across all legitimate/acceptable forms of identification independently of which KYC Processor 1620 is involved. The Attributes Registry/Coordinator 1625 determines the KYCid at 1675, potentially using Selected PII TOKENS as in one embodiment in which the (composite token) pre-KYCid=HMAC(KYC_H-MAC_KEY, hash(Selected PII TOKENS)), where KYC_H-MAC_KEY is an HMAC key held by the Coordinator 1625, preferably used solely for the purpose of generation of pre-KYCid values. In one embodiment, KYCid is a randomly generated value that is associated with the pre-KYCid within a database accessible to the Attributes Registry/Coordinator 1625, where the terms KYCid and pre-KYCid are as included in Table 1. The Attributes Registry/Coordinator 1625 should therefore attempt to look up the pre-KYCid in the database. If no entry is found, then a new random value is generated, entered in the database as associated with the pre-KYCid and used as the KYCid.

The posting of an Attestation (as defined in Table 1 as Attestation example (b)) by the Attributes Registry/Coordinator 1625 at 1680 results in KYC Smart Contract 1630 state that maps together the following: hash(hash(WalletSig) ||WalletAddress)) (as computed by the Attributes Registry/Coordinator 1625 from hash(WalletSig) and WalletAddress), dataType, Attestation_Up, Attestation_Down, Nonce, KYCid and a timestamp. The Attributes Registry/Coordinator 1625 sends the Attestation within a blockchain transaction at 1680 that is verifiable using a signature verification public key that is authenticated within the code of the KYC Smart Contract 1630. The authenticated and publicly available Coordinator's public key is used by the KYC Smart Contract 1630 to verify the native blockchain signature tied to the sender.

In an alternative embodiment, the posting of an Attestation (as defined in Table 1 as Attestation example (c)) results in KYC Smart Contract state that maps together elements that include Attestation_Up, but do not include Attestation_Down.

In another alternative embodiment, the posting of an Attestation (as defined in Table 1 as Attestation example (d)) results in KYC Smart Contract state that maps together elements that include Attestation_Down, but do not include Attestation_Up.

With reference to FIG. 16 in particular, by one approach, the Coordinator, as a coordinating network element and as the recognized source of one or more Attestations, submits an Attestation, wherein the Attestation represents a User-personalized assignment of an interval of values of the attribute and the Attestation is generated independently of any application-specific policy.

Referring now to FIG. 17, this is an alternative embodiment of a Query in which an Attestation has been performed as depicted in FIG. 16. A User 1715 accesses their wallet of interest via a Client 1710 at 1730 in order to generate WalletSig (via application of the wallet private key), which when hashed and combined with WalletAddress produces hash(hash(WalletSig)||WalletAddress). The resultant hash value, along with the dataTypes in the selected List(data-Type), serves as a pointer to the Attestations on the block-chain which the MSB Smart Contract is instructed to query against (where the Client 1710 accesses the relevant Nonces at 1735). In FIG. 17, Client 1710, User 1715, and Web Interface 1720 are as introduced as 105, 110 and 115, respectively, in FIG. 1.

The User 1715, via the Client 1710, computes hash (0||dataType||UpdateIndex||hash(NonceSig)) and hash (1||dataType||UpdateIndex||hash(NonceSig)) for NonceSig values generated by the User's wallet private key at 1740 for each Nonce retrieved from the blockchain as corresponding to an Attestation of interest. Note that these two hash values may be considered to comprise a bifurcation of NonceSigKD defined earlier. The User 1715 determines a raw attribute interval i to submit as their lower bound interval and raw attribute interval n+1−j to submit as their upper bound interval, where i and j are integers, and i and n+1−j label raw attribute intervals (where n is the label of the uppermost raw attribute interval of the given dataType). Such determination may be based, at least in part, on the User's knowledge of an MSB-specific policy. The User 1715 can independently solve the puzzle of their currently assigned interval label, say, k (and know how to interpret that assignment if they know the mapping of interval labels to actual data value ranges and the context/significance of data values). The User 1715 can solve for a value of k from an Attestation_Up or Attestation_Down associated to the User 1715 via an Attestation on the blockchain, by repeatedly hashing using hash(0||dataType||UpdateIndex||hash (NonceSig)) or hash(1||dataType||UpdateIndex||hash(NonceSig)), respectively.

The User 1715 computes Pre-Attestations at 1745 as follows: Pre-Attestation_Up=$hash^{k-i}$(hash(0||dataType||UpdateIndex||hash(NonceSig))) to prove the User's specific value is located within raw attribute interval i or greater; Pre-Attestation_Down=$hash^{n+1-k-j}$(hash(1||dataType||UpdateIndex||hash(NonceSig))) to prove the User's specific value is located within raw attribute interval n+1−j or lesser.

The Query to the MSB Smart Contract 1725 is submitted by the User 1715, via a Client 1710 and the native transaction signature is generated by application of the User's wallet private key. The body of the transaction at 1750 includes the WalletPubKey, wallet output derivatives, List (dataType), and List(Pre-Attestations) where wallet output derivatives here refers to hash(WalletSig) and WalletAddress. WalletPubKey is usable to verify the transaction signature. In the configuration of some embodiments, WalletPubKey need not be explicitly sent in that it is retrievable from other sent information such as including the message and the signature computed over the message.

The execution of the MSB Smart Contract 1725 code includes verification of the User's wallet-generated transaction signature. For Queries to the KYC Smart Contract 1705 by the MSB Smart Contract 1725, no associated signature (native or otherwise) is required since this is a smart contract-to-smart contract invocation. The Query to the KYC Smart Contract 1705 at 1755 includes wallet output derivatives, List(dataType), and List(Pre-Attestations).

The KYC Smart Contract 1705 utilizes hash(WalletSig) and WalletAddress to attempt to locate Attestations via hash(hash(WalletSig)||WalletAddress). The most recently posted Attestation_Up and Attestation_Down of each dataType within List(dataType) is chosen for re-computation of the Attestations in order to check for a match. At 1760 the KYC Smart Contract 1705 hashes the received Pre-Attestation_Up until the result equals Attestation_Up or the number of hashes performed would exceed n (the number of raw attribute intervals of the given dataType, which is a parameter coded into the KYC Smart Contract). If result equals Attestation_Up, the KYC Smart Contract determines i such that the User's specific value is located within raw attribute interval i or greater (i.e., $hash^i$(Pre-Attestation_Up)=$hash^i$($hash^{k-i}$(hash(0||dataType||UpdateIndex||hash (NonceSig))))=$hash^k$(hash(0||dataType||UpdateIndex||hash (NonceSig)))=Attestation_Up). Similarly, the KYC Smart Contract 1705 hashes the received Pre-Attestation_Down until the result equals Attestation_Down or the number of hashes performed would exceed n. If result equals Attestation_Down, the KYC Smart Contract determines j such that the User's specific value is located within interval n+1−j or lesser (i.e., $hash^j$(Pre-Attestation_Down)=$hash^j$($hash^{n+1-k-j}$ (hash(1||dataType||UpdateIndex||hash(NonceSig))))= $hash^{n+1-k}$(hash(1||dataType||UpdateIndex||hash (NonceSig)))=Attestation_Down). In particular, to prove the User's specific value is located within raw attribute interval k, the User 1715 would send Pre-Attestation_Up=$hash^{k-k}$ (hash(0||dataType||UpdateIndex||hash(NonceSig))) implying the User's specific value is located within raw attribute interval k or greater and Pre-Attestation_Down= $hash^{n+1-k-(n+1-k)}$(hash(1||dataType||UpdateIndex||hash(NonceSig))) implying the User's specific value is located within interval n+1−(n+1−k)=k or lesser.

With regard to each response of the list of responses returned at 1765, as the KYC Smart Contract 1705 execution goes through the dataType list and Pre-Attestation list, if the KYC Smart Contract 1705 is able to find a match on the dataType, then, in accordance with the result found at 1760 corresponding to the Pre-Attestation_Up, it returns i if there was a match or No if there was no match, and, in accordance with the result found at 1760 corresponding to the Pre-Attestation_Down, it returns j if there was a match or No is there was no match. If there was a match on the KYCid, but not on a dataType, the KYC Smart Contract 1705 returns a dataType_Not_Found error. If there was no match on the KYCid at all, the KYC Smart Contract 1705 returns a KYCid_Not_Found error at 1765. Alternatively to the KYC Smart Contract 1705 returning i and j values within responses at 1765 the User 1715 can provide these values as associated with the list of Pre-Attestations at 1750 and forwarded by the MSB Smart Contract 1725 to the KYC Smart Contract 1705 at 1755. In this case, the KYC Smart Contract indicates Yes or No within a response at 1765 dependent on whether or not iterated hash computation using only the given value of i or j resulted in matching the corresponding attested to value of Attestation_Up or Attestation_Down, respectively. In either case, the MSB Smart Contract 1725 preferably determines whether or not the i and j values comport with the relevant MSB-specific policy.

The hash function, if properly chosen, may be presumed to be computationally infeasible to invert, which bars the User from successfully "proving" their specific value is located within an interval greater than k+1 or lesser than k−1. The released Pre-Attestations should be checked to be of hash-word length by the MSB Smart Contract or by KYC Smart Contract (or truncated to hash-word length) to prevent a cheating User from successfully using their knowledge of (0||dataType||UpdateIndex||hash(NonceSig)) to "prove" their specific value is located within raw attribute interval k+1. Similarly, such check ensures that the User's knowledge of (1||dataType||UpdateIndex||hash(NonceSig)) is insufficient to "prove" their specific value is located within raw attribute interval k−1.

This embodiment handles arbitrary dataTypes i.e., even those with intervals with a single entry where no ordering across data values is necessarily implied. E.g., for dataType of "color," one can assign each color a unique data value—or use intervals to express a range of intensity of a given color (i.e., where an order may be implied within a given interval without necessarily implying an ordering across intervals).

In an embodiment in which it is desired to hide knowledge of k from the Coordinator, the KYC Processor can (if it retains knowledge of hash(NonceSig) for use in Attestation updating without User involvement) pre-compute Attestation_Up and/or Attestation_Down after pulling the relevant score (e.g., via a monitoring service), where the Coordinator signs to generate the actual Attestation. As a further alternative embodiment, KYC Processors may directly attest to the blockchain without using a Coordinator. Note that the sandwiching method avoids inner token and outer token sequential processing in that the User-personalization is performed upfront (which is why the option of KYC Processor-retained knowledge of hash(NonceSig) (or of NonceSig) was mentioned above.

An alternative embodiment could utilize a keyed hash, such as HMAC, instead of hash (with HMAC key(s) available for use during proof verification).

In an alternative embodiment, the User, via the Client, computes one but not both of hash(0||dataType||UpdateIndex||hash(NonceSig)) and hash(1||dataType||UpdateIndex||hash(NonceSig)). In such an embodiment, the User computes one but not both of Pre-Attestation_Up=$hash^{k-i}$(hash (0||dataType||UpdateIndex||hash(NonceSig))) to prove the User's specific value is located within raw attribute interval i or greater, and Pre-Attestation_Down=$hash^{n+1-k-j}$(hash (1||dataType||UpdateIndex||hash(NonceSig))) to prove the User's specific value is located within raw attribute interval n+1−j or lesser.

With reference to FIG. 17 in particular, by one approach, access to the User-personalized assignment of the interval of values of the attribute is hidden and the User 1715 can query against the Attestation to selectively release access to a restricted range of values that includes the interval of values of the attribute.

Figure 18:
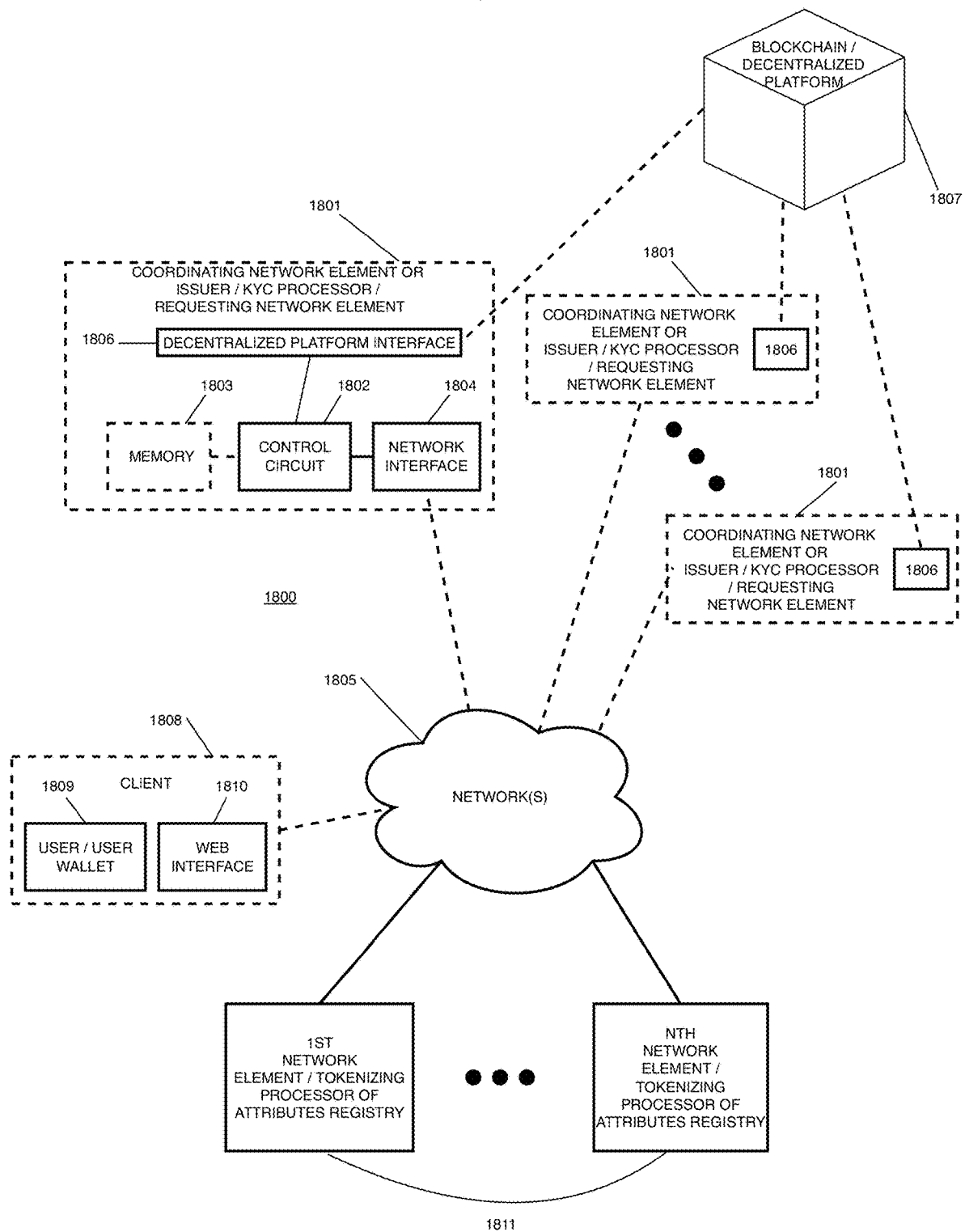
FIG. 18 comprises a flow diagram as configured in accordance with various embodiments of these teachings and that illustrates the architecture of a coordinating network element or issuer/KYC Processor/requesting network element and the topology of the communications. In this particular example, the enabling apparatus includes a coordinating network element or issuer/KYC Processor/requesting network element configured to effect a data-based activity via a corresponding network and manage a protocol that prohibits the coordinating network element or issuer/KYC Processor/requesting network element from substantively accessing data content that, at least in part, underlies received protocol-compliant requests.

Now referring to FIG. 18, an illustrative apparatus 1800 that is compatible with many of these teachings will now be presented.

In this particular example, the enabling apparatus 1800 includes a coordinating network element or issuer/KYC Processor/requesting network element 1801. This coordinating network element or issuer/KYC Processor/requesting network element is configured to effect a data-based activity via one or more corresponding networks 1805. As will be described in more detail herein, this coordinating network element or issuer/KYC Processor/requesting network element 1801 manages a protocol that prohibits the coordinating network element or issuer/KYC Processor/requesting network element 1801 from substantively accessing data content that, at least in part, underlies received protocol-compliant requests.

In this illustrative example the coordinating network element or issuer/KYC Processor/requesting network element 1801 includes a control circuit 1802. Being a "circuit," the control circuit 1802 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 1802 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 1802 is configured (for example, by using corresponding programming as will be well understood by those skilled in the art) to carry out one or more of the steps, actions, and/or functions described herein.

By one optional approach the control circuit 1802 operably couples to a memory 1803. This memory 1803 may be integral to the control circuit 1802 or can be physically discrete (in whole or in part) from the control circuit 1802 as desired. This memory 1803 can also be local with respect to the control circuit 1802 (where, for example, both share a common circuit board, chassis, power supply, and/or housing) or can be partially or wholly remote with respect to the control circuit 1802 (where, for example, the memory 1803 is physically located in another facility, metropolitan area, or even country as compared to the control circuit 1802).

In addition to storing other information as described herein, this memory 1803 can serve, for example, to non-transitorily store the computer instructions that, when executed by the control circuit 1802, cause the control circuit 1802 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

In this example the control circuit 1802 also operably couples to a network interface 1804. So configured the control circuit 1802 can communicate with other elements (both within the apparatus 1800 and external thereto) via the network interface 1804. More particularly, the network interface 1804 facilitates compatible communications via one or more networks 1805. In addition, the control circuit 1802 also operably couples to a decentralized platform interface 1806. Similarly, so configured the control circuit 1802 can communicate with the blockchain/decentralized platform 1807 via the decentralized network interface 1806. Numerous examples are known in the art. A non-exhaustive listing would include Universal Serial Bus (USB)-based interfaces, RS232-based interfaces, I.E.E.E. 1394 (aka Firewire)-based interfaces, Ethernet-based interfaces, any of a variety of so-called Wi-Fi™-based wireless interfaces, Bluetooth™-based wireless interfaces, cellular telephony-based wireless interfaces, Near Field Communications (NFC)-based wireless interfaces, standard telephone landline-based interfaces, cable modem-based interfaces, and digital subscriber line (DSL)-based interfaces. Such interfaces can be selectively employed to communicatively couple the control circuit 1802 to another network element, to a local area network, or to any of a variety of wide area networks or extranets (such as, but not limited to, the Internet).

Relevant to the following description, so configured, the coordinating network element or issuer/KYC Processor/requesting network element 1801 can compatibly communicate via the aforementioned protocol with any of a plurality of requesting network elements 1811 (illustrated in FIG. 18 as a first network element/tokenizing processor of Attributes Registry through an Nth network element/tokenizing processor of Attributes Registry).

Other apparatuses that may play a part in effecting the data-based activity in a given application setting include such elements as a Client 1808 that is comprised of a User/User Wallet 1809 and a Web Interface 1810 that the User/User Wallet 1809 utilizes to make network requests.

With reference to FIG. 18 in particular, by one approach, an apparatus for enabling a solely on-platform vetting, on a blockchain platform or on another decentralized platform as a decentralized-execution-based platform, of a User, as an individual-, group- or machine-based User, at a time of a Query against an Attestation comprises: (1) a network interface; (2) a decentralized platform interface; (3) a control circuit operably coupled to the network interface and configured as a coordinating network element that manages a protocol configured to communicate via off-platform communications directly with a requesting network element or with a network element that serves as intermediary between at least one requesting network element and the coordinating network element; (4) the control circuit operably coupled to the decentralized platform interface and configured as the coordinating network element that manages the protocol configured to attest to an Attribute Value via submission of one or more transactions to the blockchain or another decentralized platform as a recognized source of one or more Attestations.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

The table below (i.e., Table 1) lists the primary terminology used in the embodiments depicted herein. In addition, their definitions and expressions are examples that are primarily used in the text, however, may differ if otherwise specified in the text. Nonces used here (with the exception of UserTxnNonce) are independent of native blockchain/native platform nonces, if any, used to define transaction order and/or to prevent successful transaction replay. The KYC framework includes KYC Processor(s) (as participant (s)), Attributes Registry or Attributes Registries (including tokenization processors (e.g., Backend(s); Translator(s)) as well as Coordinator(s)/coordinating network element(s)).

TABLE 1

| | |
|---|---|
| Attestation | (a) Attestation = hash(KYCid \|\| NonceSigKD \|\| hash(hash(WalletSig) \|\| WalletAddress) \|\| Attribute Value), as example |
| | (b) Attestation = Attestation_Up; Attestation_Down, as example |
| | (c) Attestation = Attestation_Up, as example |
| | (d) Attestation = Attestation_Down, as example |
| Attestation_Up | $hash^k$ (hash(0 \|\| dataType \|\| UpdateIndex \|\| hash(NonceSig))) |
| Attestation_Down | $hash^{n+1-k}$ (hash(1 \|\| dataType \|\| UpdateIndex \|\| hash(NonceSig))) |
| Attribute Value | If data of the specific dataType should be tokenized, resulting in a tokenized form of the data: |
| | As example, Attribute Value = $f_1$ ($f_2$ (KYCid \|\| Nonce), Blockchain Token) = pP |
| | where p = elliptic curve scalar representation of Blockchain Token, |
| | and P = elliptic curve point representation of hash(KYCid \|\| Nonce) or of hash(KYCid \|\| NonceSig*) where NonceSig* = hash(hash(NonceSig) \|\| UpdateIndex). |
| | If data of the specific dataType should not be tokenized: |
| | Attribute Value = raw attribute value, as example |
| Blockchain Token | HMAC(BLOCKCHAIN_HMAC_KEY, raw attribute interval Token), as example |
| KYCid | KYC Identifier used to correlate multiple wallet addresses to the same User Random associated with the pre-KYCid in a Coordinator held database, as example |
| | KYCid = pre-KYCid, as example |
| Nonce | Random Nonce generated by the KYC Processor and retrieved by the Web interface |
| NonceSig | Sign(Nonce) by the User's wallet |
| NonceSigKD | hash(dataType \|\| UpdateIndex \|\| hash(NonceSig)) |
| Nonce_validity_period | Time interval during which the Nonce should be considered valid |
| ProxySig | Sign(MSB Smart Contract ID \|\| hash(WalletSig), UserTxnNonce + 1 \|\| List(dataType), List(NonceSigKD) \|\| List(Attribute Value)) |
| | signed* by the uberProxy (*e.g., HMAC or ECDSA) |
| Pre-Attestation_Up | $hash^{k-i}$ (hash(0 \|\| dataType \|\| UpdateIndex \|\| hash(NonceSig))) |
| Pre-Attestation_Down | $hash^{n+1-k-j}$ (hash(1 \|\| dataType \|\| UpdateIndex \|\| hash(NonceSig))) |
| pre-KYCid | HMAC(KYC_HMAC_KEY, hash(Selected PII TOKENS)) |
| raw attribute interval | Non-tokenized form of data being attested or queried in the form of a range/interval |
| raw attribute interval token | Tokenized form of the raw attribute interval to become a blockchain token |
| raw attribute value | Non-tokenized form of data being attested or queried |
| Selected PII TOKENS | Token(FirstName) \|\| Token(LastName) \|\| Token(DOB), as example |
| Signed Nonce tuple | [Nonce; Nonce_validity_period; Sign(Nonce; Nonce_validity_period)] signed* by the KYC Processor (*e.g., HMAC or ECDSA) |

TABLE 1-continued

| | |
|---|---|
| uber_Sig | Sign(blinded hash(KYCid ‖ Nonce) = eP ‖ raw attribute interval) signed* by the uberProxy (*e.g., HMAC or ECDSA) |
| unter_Sig | Sign(blinded Attribute Value = peP) signed* by the unterProxy (*e.g., HMAC or ECDSA) |
| UpdateIndex | A counter that tracks the number of updates on the same KYCid, Nonce and dataType |
| UserAuditSig | Sign(List(dataType); List(NonceSigKD); hash(WalletSig)), as example |
| UserSignedMessage | Sign(hash(WalletSig); List(dataType); List(NonceSigKD); UserQuerySig; WalletPubKey; List(Attribute Value)) where the signature is the native transaction signature by the Proxy |
| UserQuerySig | Sign(List(dataType); List(NonceSigKD); hash(WalletSig)), as example |
| UserTxnNonce | A native blockchain nonce used within the blockchain (or other platform) infrastructure that is incremented with each successive native blockchain signature/native platform signature generated by the User Wallet |
| WalletAddress | User's blockchain wallet address (derivable from WalletPubKey) |
| wallet outputs | A signature performed by a User Wallet, e.g., WalletSig |
| wallet output derivatives | A function of a signature performed by a User Wallet, e.g., hash(WalletSig) |
| WalletPubKey | The wallet public key pertaining to a User's wallet |
| WalletSig | Sign(WalletAddress), as a signature generated by a User's wallet private key over WalletAddress as an argument |

The following is the code of one implementation of an embodiment of facets of the design described herein.

```
// SPDX-License-Identifier: UNLICENSED
pragma solidity ^0.8.0;
import "@openzeppelin/contracts-upgradeable/proxy/utils/UUPSUpgradeable.sol";
import "./Ky0xGovernance.sol";
contract Ky0xMain is AccessControl, UUPSUpgradeable, Ky0xStore, Ky0xGovernance {
    using SafeERC20 for IERC20Metadata;
    /**
    * @notice Override function defined in UUPSUpgradeable
    * @dev Function that should revert when `msg.sender` is not authorized to upgrade the contract. Called by
    * {upgradeTo} and {upgradeToAndCall}.
    */
    function _authorizeUpgrade(address) internal override view {
        require(hasRole(DEFAULT_ADMIN_ROLE, msg.sender), "admin only");
    }
    /**
    * @notice Called `initialize` because it is a Proxiable contract following EIP-1822 standard
    * @param _governance address for the GnosisSafe Admin
    * @param _treasury address for the GnosisSafe treasury
    * @param _attestor address for the whitelisted attestor
    */
    function initialize(
        address _governance, address _treasury, address _attestor
    ) public initializer
    {
        require(treasury == address(0), "treasury already set");
        treasury = _treasury;
        _setupRole(DEFAULT_ADMIN_ROLE, _governance);
        _setupRole(ATTESTOR_ROLE, _attestor);
        // Enabling ID_STATUS
        dataTypesMap[0] = true;
        // Enabling AML_STATUS
        dataTypesMap[1] = true;
        // Set Initial Transaction Cost to 1$ (2 decimals)
        transactionCostUSD = 1e18;
        // Not Paused
        paused = false;
    }
    /**
    * @notice Never attest to any sensitive data
    * @dev Post obfuscated attestations about an individual. This data can only be unlocked by the individual itself.
    * @param _hashWalletSigAndAddrs List[keccak256(Keccak256(WalletSig) | WalletAddress))]
    * @param _attestations list of attestations about an individual
    * @param _nonces list of unique nonces auto-generated during on-boarding
    * @param _kIDs list of identifiers associated to `WalletAddress`
    * @param _dataTypes list of attestation dataTypes (ex: ID_STATUS, AML_STATUS, WALLET_STATUS)
    */
    function postAttributes(
        bytes32[ ] calldata _hashWalletSigAndAddrs,
        bytes32[ ] calldata _attestations,
        bytes32[ ] calldata _nonces,
        bytes32[ ] calldata _kIDs,
        uint256[ ] calldata _dataTypes
    ) public virtual
```

```
{
    require(paused == false, "Paused");
    require(hasRole(ATTESTOR_ROLE, msg.sender), "attestor only");
    require(_attestations.length > 0 && _attestations.length <10, "batch size should be between 1 and 9");
    require(
        (_hashWalletSigAndAddrs.length == _attestations.length)
        && (_hashWalletSigAndAddrs.length == _nonces.length)
        && (_hashWalletSigAndAddrs.length == _kIDs.length)
        && (_hashWalletSigAndAddrs.length == _dataTypes.length),
        "postAttributes - length not equal"
    );
    for (uint256 i = 0; i < _attestations.length; i++) {
        _saveWalletInfo(_hashWalletSigAndAddrs[i], _attestations[i], _nonces[i], _kIDs[i], _dataTypes[i]);
    }
}
/**
 * @dev Save the attestation in storage in `walletInfoMap`.
 * @param _hashWalletSigAndAddr keccak256(Keccak256(WalletSig) | WalletAddress))
 * @param _attestation attestation about an individual
 * @param _nonce unique nonces auto-generated during on-boarding
 * @param _kID identifier associated to `WalletAddress`
 * @param _dataType attestation dataType (ex: ID_STATUS, AML_STATUS, WALLET_STATUS)
 */
function _saveWalletInfo(
    bytes32 _hashWalletSigAndAddr,
    bytes32 _attestation,
    bytes32 _nonce,
    bytes32 _kID,
    uint256 _dataType
) internal {
    require(dataTypesMap[_dataType], "Datatype not enabled");
    require(
        _nonce !=bytes32(0)
        && _attestation != bytes32(0)
        && _hashWalletSigAndAddr != bytes32(0)
        && _kID != bytes32(0),
        "cannot be bytes(0)"
    );
    walletInfoMap[_hashWalletSigAndAddr][_dataType] = WalletInfo({
        attestation: _attestation,
        nonce: _nonce,
        kID: _kID,
        blockNumber: block.number
    });
}
/**
 * @dev Retrieve a user Nonce necessary to unlock attestations.
 * @param _hashWalletSig Keccak256(WalletSig)
 * @param _dataTypes list of attestation data types
 * @return list of error status (0: OK, 1: NOT_FOUND)
 * @return list of nonces
 */
function getNonces(bytes32 _hashWalletSig, uint256[ ] calldata _dataTypes)
    public
    view
    virtual
    returns (uint8[ ] memory, bytes32[ ] memory)
{
    bytes32[ ] memory nonces = new bytes32[ ](_dataTypes.length);
    uint8[ ] memory errors = new uint8[ ](_dataTypes.length);
    bytes32 hashWalletSigAndAddr = keccak256(abi.encode(_hashWalletSig, msg.sender));
    bytes32 nonce;
    for (uint256 i = 0; i < _dataTypes.length; i++) {
        (,nonce,,) = _getWalletInfo(hashWalletSigAndAddr, _dataTypes[i]);
        nonces[i] = nonce;
        errors[i] = nonce !=bytes32(0) ? uint8(Error.NO_ERROR) : uint8(Error.NOT_FOUND);
    }
    return (errors, nonces);
}
/**
 * @dev Retrieve the latest blockNumber for specific attestation for a wallet address per data Types.
 * @param _hashWalletSig Keccak256(WalletSig)
 * @param _userAddr individual wallet address
 * @param _dataTypes list of attestation data types
 * @return list of blockNumber when the attestation got mined
```

```
*/
function getBlockNumbers(bytes32 _hashWalletSig, address _userAddr, uint256[ ] calldata
_dataTypes)
    public
    view
    virtual
    returns (uint256[ ] memory)
{
    uint256[ ] memory blockNumbers = new uint256[ ](_dataTypes.length);
    bytes32 hashWalletSigAndAddr = keccak256(abi.encode(_hashWalletSig, _userAddr));
    uint256 blockNumber;
    for (uint256 i = 0; i < _dataTypes.length; i++) {
        (,,,blockNumber) = _getWalletInfo(hashWalletSigAndAddr, _dataTypes[i]);
        blockNumbers[i] = blockNumber;
    }
    return (blockNumbers);
}
/**
 * @dev Query specific attributes by providing the data types and the raw values.
 * @param _hashWalletSig keccak256(WalletSig)
 * @param _userAddr individual wallet address
 * @param _nonceSigsKD keccak256(dataTypeIndex | keccak256(nonceSig))
 * @param _dataTypes list of attestation dataTypes (ex: ID_STATUS, AML_STATUS,
WALLET_STATUS)
 * @param _rawValues list of values to match against (ex: PASS, FAIL)
 * @param _tokenPayment ERC20 address used for transaction payment
 * @return the unique ky0xID associated to `_userAddr` - bytes32(0) if not found
 * @return list of matches (0: NOT_FOUND, 1: MATCH, 2: NO_MATCH)
 */
function queryAttributesMatch(
    bytes32 _hashWalletSig,
    address _userAddr,
    bytes32[ ] calldata _nonceSigsKD,
    uint256[ ] calldata _dataTypes,
    bytes32[ ] calldata _rawValues,
    address _tokenPayment
)
    external
    virtual
    returns (bytes32, uint8[ ] memory)
{
    require(
        _nonceSigsKD.length == _dataTypes.length
        && _nonceSigsKD.length == _rawValues.length,
        "queryAttributesMatch - not same length"
    );
    _sendPayment(_tokenPayment);
    uint8[ ] memory matches = new uint8[ ](_rawValues.length);
    bytes32 kID;
    WalletInfo storage w;
    bytes32 hashWalletSigAndAddr = keccak256(abi.encode(_hashWalletSig, _userAddr));
    for (uint256 i = 0; i < _dataTypes.length; i++) {
        require(dataTypesMap[_dataTypes[i]], "Datatype not enabled");
        w = walletInfoMap[hashWalletSigAndAddr][_dataTypes[i]];
        if (w.kID == bytes32(0)) {
            matches[i] = uint8(MatchStatus.NOT_FOUND);
            continue;
        }
        bytes32 attestation = keccak256(
            abi.encode(
                w.kID,
                _nonceSigsKD[i],
                hashWalletSigAndAddr,
                _rawValues[i]
            )
        );
        matches[i] = (w.attestation == attestation) ? uint8(MatchStatus.MATCH) :
uint8(MatchStatus.NO_MATCH);
        kID = w.kID;
    }
    return (kID, matches);
}
/**
 * @dev Retrieve Wallet Information for an individual for a dataType.
 * @param _hashWalletSigAndAddr keccak256(Keccak256(WalletSig) | WalletAddress))
 * @param _dataType attestation dataType (ex: ID_STATUS, AML_STATUS,
WALLET_STATUS)
 * @return (attestation, nonce, ky0xID, blockNumber)
 */
```

```
function _getWalletInfo(bytes32 _hashWalletSigAndAddr, uint256 _dataType)
    internal
    view
    returns (bytes32, bytes32, bytes32, uint256)
{
    require(dataTypesMap[_dataType], "Datatype not enabled");
    WalletInfo storage w = walletInfoMap[_hashWalletSigAndAddr][_dataType];
    return (w.attestation, w.nonce, w.kID, w.blockNumber);
}
/**
 * @dev Verify allowance and execute payment in native token based on
`transationCostUSD`.
 * @param _tokenPayment address for the ERC20 token to pay with
 */
function _sendPayment(address _tokenPayment) internal {
    require(tokenAllowedPaymentMap[_tokenPayment], "token not supported for payment");
    IERC20Metadata erc20 = IERC20Metadata(_tokenPayment);
    uint256 amount = calculateAmountPayment(_tokenPayment);
    require(erc20.allowance(msg.sender, address(this)) >= amount, "Insufficient Token
allowance");
    erc20.safeTransferFrom(msg.sender, treasury, amount);
}
/**
 * @dev Calculate the amount of tokens that corresponds to `transactionCostUSD`
 * @param _tokenPayment address for the ERC20 token to pay with
 * @return Amount of tokens in the ERC20 decimals
 */
function calculateAmountPayment(address _tokenPayment)
    public virtual view returns (uint256)
{
    require(tokenAllowedPaymentMap[_tokenPayment], "token not supported for payment");
    int256 currentPrice = _getPrice(_tokenPayment);
    IERC20Metadata erc20 = IERC20Metadata(_tokenPayment);
    require(currentPrice > 0, "price is 0 or negative");
    require(_getOracleDecimals(_tokenPayment) <= 18, "oracle decimals > 18");
    uint256 costByOracleDecimal = transactionCostUSD / 10 ** (18 -
_getOracleDecimals(_tokenPayment));
    uint256 amount = (costByOracleDecimal * (10 ** erc20.decimals( ))) /
uint256(currentPrice);
    return amount;
}
/**
 * @dev Retrieve the latest price feed from chainLINK Oracle Aggregator
 * @param _erc20 address of the ERC20 token
 * @return Price
 */
function _getPrice(address _erc20) internal view returns (int256) {
    int256 answer;
    (,answer,,,) = priceFeedMap[_erc20].latestRoundData( );
    return answer;
}
/**
 * @dev Retrieve the decimal for the price feed from chainLINK Oracle Aggregator
 * @param _erc20 address of the ERC20 token
 * @return decimals for the answer value
 */
function _getOracleDecimals(address _erc20) internal view returns (uint8) {
    return priceFeedMap[_erc20].decimals( );
}
}
```

What is claimed is:

1. A method for enabling a solely on-platform vetting, on a blockchain platform or on an another decentralized-execution-based platform, of a user, as an individual-, group- or machine-based user, at a time of a query against an attestation, the method comprising:
by a coordinating network element that manages a protocol:
via off-platform communications, receiving from a requesting network element directly, or receiving as routed through at least one network element that serves as intermediary between at least one requesting network element and the coordinating network element, an attestation request that results from processing a user request to register a key-pair-enabled app that is a decentralized platform-compatible key-pair-enabled app as being associated with a user profile populated by off-platform-determined values of an attribute;
attesting to an attribute value, as derived from one or more such off-platform-determined values of the attribute, via submission of one or more transactions to the blockchain platform or the another decentralized-execution-based platform as a recognized source of one or more attestations.

2. The method of claim 1 wherein the attesting to the attribute value occurs as an updating of a previous attesting to the attribute value, as a result of monitoring activity conducted by a third-party entity.

3. The method of claim 1 further comprising at least one of:
- the user request to register the key-pair-enabled app comprising generation by the key-pair-enabled app of a deterministic digital signature as one of at least one deterministic digital signature a function of which is derived, as a function of the deterministic digital signature, by the requesting network element or the coordinating network element and incorporated into the attestation; and
- a user-initiated query request involving retrieval of information by the user from the blockchain platform or the another decentralized-execution-based platform over which at least one deterministic digital signature is regenerated by the key-pair-enabled app that is designated by the attestation.

4. The method of claim 1 wherein the requesting network element submits a tokenization request as part of the attestation request, which results in access by the coordinating network element to a platform token that is combined with user-specific information by the coordinating network element for incorporation into the attestation.

5. The method of claim 4 wherein the requesting network element submits the tokenization request independently of any application-specific policy.

6. The method of claim 4 wherein the user-specific information is represented as an elliptic curve point and the platform token is represented as a scalar multiplier.

7. The method of claim 1 wherein the attestation request includes at least one value comprised of a function of data, resulting in posting to the blockchain platform or to the another decentralized-execution-based platform at least one of:
- a resultant value derived as a first tokenized form of the data; and
- a resultant value that is independently generated and that is associated within a database accessible to the coordinating network element with a second tokenized form of the data, which may be the same as or different than the first tokenized form of the data, if any.

8. The method of claim 7 wherein the data is blinded from access by at least one of:
- the coordinating network element; and
- the at least one network element that serves as intermediary between the at least one requesting network element and the coordinating network element.

9. The method of claim 7 wherein the resultant value represents at least one of:
- a constant reference point across all key-pair-enabled apps of the user except for the key-pair-enabled apps of the user, if any, for which cross-key-pair-enabled app association to the user has been deactivated; and
- a user-personalized assignment of an interval of values of the attribute.

10. The method of claim 7 wherein the resultant value is a user-specific token that is generated by combining a platform token, which represents an interval of values of the attribute, with user-specific information.

11. The method of claim 1 wherein the coordinating network element, as the recognized source of one or more attestations, submits the attestation, wherein the attestation represents a user-personalized assignment of an interval of values of the attribute and the attestation is generated independently of any application-specific policy.

12. The method of claim 11 wherein access to the user-personalized assignment of the interval of values of the attribute is hidden and wherein the user can query against the attestation to selectively release access to a restricted range of values that includes the interval of values of the attribute.

13. The method of claim 1 wherein a proxy, as contacted by the user, outputs a tokenized form of a raw attribute interval, wherein the raw attribute interval is assigned to the user based, at least in part, on an assertion provided by the user.

14. The method of claim 13 wherein the raw attribute interval is assigned in accordance with an application-specific policy.

15. The method of claim 13 wherein the proxy is split into component hierarchical sub-proxies wherein at least one sub-proxy is at least transiently blinded by an another sub-proxy from access to user-specific information.

16. The method of claim 15 wherein:
- a first sub-proxy assigns the raw attribute interval and selects the user-specific information; and
- a second sub-proxy combines a platform token that represents an interval of values of the attribute with the user-specific information.

17. The method of claim 16 wherein the first sub-proxy applies a transient blinding factor to the user-specific information before making it available to the second sub-proxy for use in a computation by the second sub-proxy and removes the transient blinding factor from the computation by the second sub-proxy.

18. The method of claim 17 wherein the transient blinding factor is applied as a scalar multiplier of an elliptic curve point.

19. An apparatus configured to enable a solely on-platform vetting, on a blockchain platform or on an another decentralized platform as a decentralized-execution-based platform, of a user, as an individual-, group- or machine-based user, at a time of a query against an attestation, the apparatus comprising:
- a network interface;
- a decentralized platform interface;
- a control circuit operably coupled to the network interface and configured as a coordinating network element that manages a protocol configured to communicate via off-platform communications directly with a requesting network element or with a network element that serves as intermediary between at least one requesting network element and the coordinating network element, and thereby receive an attestation request that results from processing a user request to register a key-pair-enabled app that is a decentralized platform-compatible key-pair-enabled app as being associated with a user profile populated by off-platform-determined values of an attribute; and
- the control circuit operably coupled to the decentralized platform interface and configured as the coordinating network element that manages the protocol configured to attest to an attribute value, as derived from one or more such off-platform-determined values of the attribute, via submission of one or more transactions to the blockchain platform or the another decentralized platform as a recognized source of one or more attestations.

20. The apparatus of claim 19 wherein the attesting to the attribute value occurs as an updating of a previous attesting to the attribute value, as a result of monitoring activity conducted by a third-party entity.

21. The apparatus of claim 19 further comprising at least one of:
- the user request to register the key-pair-enabled app comprising generation by the key-pair-enabled app of a deterministic digital signature as one of at least one deterministic digital signature a function of which is derived, as a function of the deterministic digital signature, by the requesting network element or the coordinating network element and incorporated into the attestation; and a user-initiated query request involving retrieval of information by the user from the blockchain or the another decentralized platform over which at least one deterministic digital signature is regenerated by the key-pair-enabled app that is designated by the attestation.

22. The apparatus of claim 19 wherein the requesting network element submits a tokenization request as part of the attestation request, which results in access by the coordinating network element to a platform token that is combined with user-specific information by the coordinating network element for incorporation into the attestation.

23. The apparatus of claim 22 wherein the requesting network element submits the tokenization request independently of any application-specific policy.

24. The apparatus of claim 22 wherein the user-specific information is represented as an elliptic curve point and the platform token is represented as a scalar multiplier.

25. The apparatus of claim 19 wherein the attestation request includes at least one value comprised of a function of data, resulting in posting to the blockchain or to the another decentralized platform at least one of:
a resultant value derived as a first tokenized form of the data; and
a resultant value that is independently generated and that is associated within a database accessible to the coordinating network element with a second tokenized form of the data, which may be the same as or different than the first tokenized form of the data, if any.

26. The apparatus of claim 25 wherein the data is blinded from access by at least one of:
the coordinating network element; and
the at least one network element that serves as intermediary between the at least one requesting network element and the coordinating network element.

27. The apparatus of claim 25 wherein the resultant value represents at least one of:
a constant reference point across all key-pair-enabled apps of the user except for the key-pair-enabled apps of the user, if any, for which cross-key-pair-enabled app association to the user has been deactivated; and
a user-personalized assignment of an interval of values of the attribute.

28. The apparatus of claim 25 wherein the resultant value is a user-specific token that is generated by combining a platform token, which represents an interval of values of the attribute, with user-specific information.

29. The apparatus of claim 19 wherein the coordinating network element, as the recognized source of one or more attestations, submits the attestation, wherein the attestation represents a user-personalized assignment of an interval of values of the attribute and the attestation is generated independently of any application-specific policy.

30. The apparatus of claim 29 wherein access to the user-personalized assignment of the interval of values of the attribute is hidden and wherein the user can query against the attestation to selectively release access to a restricted range of values that includes the interval of values of the attribute.

31. The apparatus of claim 19 wherein a proxy, as contacted by the user, outputs a tokenized form of a raw attribute interval, wherein the raw attribute interval is assigned to the user based, at least in part, on an assertion provided by the user.

32. The apparatus of claim 31 wherein the raw attribute interval is assigned in accordance with an application-specific policy.

33. The apparatus of claim 31 wherein the proxy is split into component hierarchical sub-proxies wherein at least one sub-proxy is at least transiently blinded by an another sub-proxy from access to user-specific information.

34. The apparatus of claim 33 wherein:
a first sub-proxy assigns the raw attribute interval and selects the user-specific information; and
a second sub-proxy combines a platform token that represents an interval of values of the attribute with the user-specific information.

35. The apparatus of claim 34 wherein the first sub-proxy applies a transient blinding factor to the user-specific information before making it available to the second sub-proxy for use in a computation by the second sub-proxy and removes the transient blinding factor from the computation by the second sub-proxy.

36. The apparatus of claim 35 wherein the transient blinding factor is applied as a scalar multiplier of an elliptic curve point.

* * * * *